United States Patent [19]
Oguro

[11] Patent Number: 5,521,712
[45] Date of Patent: May 28, 1996

[54] TELETEXT SIGNAL RECORDING AND REPRODUCING APPARATUS

[75] Inventor: Masaki Oguro, Tokyo, Japan

[73] Assignee: Sony Corporation, Tokyo, Japan

[21] Appl. No.: 189,639

[22] Filed: Feb. 1, 1994

[30] Foreign Application Priority Data

Feb. 12, 1993 [JP] Japan ..................... 5-024297

[51] Int. Cl.⁶ ................ H04N 5/76; H04N 7/00
[52] U.S. Cl. .................... 358/335; 348/468
[58] Field of Search .................... 358/335, 343, 358/310, 342; 348/434, 435, 468, 476, 478, 563, 564, 465, 461

[56] References Cited

U.S. PATENT DOCUMENTS

| | | | |
|---|---|---|---|
| 4,520,392 | 5/1985 | Cox et al. ............... | 358/147 |
| 4,543,616 | 9/1985 | Brooks .................. | 358/335 |
| 4,695,900 | 9/1987 | Honjo et al. ............ | 358/310 |
| 5,237,412 | 8/1993 | Nakajima ............... | 348/468 |
| 5,287,224 | 2/1994 | Tsuchiya et al. ........ | 360/14.3 |
| 5,335,125 | 8/1994 | Nakatsu et al. ......... | 358/335 |

FOREIGN PATENT DOCUMENTS

| | | |
|---|---|---|
| 123959 | 11/1984 | European Pat. Off. . |
| 574892 | 12/1993 | European Pat. Off. . |
| 2132856 | 7/1984 | United Kingdom . |

OTHER PUBLICATIONS

Patent Abstracts of Japan, vol. 14, No. 210 (E-922) 27 Apr. 1990, JP-A-02 046 079 (Mitsubishi EoEctric Corp.) 15 Feb. 1990.

Patent Abstracts of Japan, vol. 16, No. 254 (E-1213) 9 Jun. 1992, JP-A-04 053 375 (Sony Corp.) 20 Feb. 1992.

Patent Abstracts of Japan vol. 15, No. 147 (E-1055) 12 Apr. 1991, JP-A-03 022 776 (Fujitsu General Ltd.).

Patent Abstracts of Japan, vol. 13, No. 450 (E-830) 11 Oct. 1989, JP-A-01 174 180 (Victor Co. of Japan, Ltd.) 10 Jul. 1989.

Primary Examiner—Tommy P. Chin
Assistant Examiner—Robert Chevalier
Attorney, Agent, or Firm—William S. Frommer; Alvin Sinderbrand

[57] ABSTRACT

A digital video tape recorder records a teletext signal together with a digital video signal on a magnetic tape. The teletext signal is extracted from a broadcast video signal and recorded in the form of binary data in auxiliary data areas of a video signal recording region in each recording track on the magnetic tape.

10 Claims, 24 Drawing Sheets

JAPAN 5.727272 MHz (364tH)
Frame code-E5(JAPAN)
MAX 560bytes

| | | | | |
|---|---|---|---|---|
| Track 1 | 35 | 35 | 35 | 7 |
| Track 2 | 28 | 35 | 35 | 14 |
| Track 3 | 21 | 35 | 35 | 21 |
| Track 4 | 14 | 35 | 35 | 28 |
| Track 5 | 7 | 35 | 35 | 35 |
| Track 6 | 35 | 35 | 35 | 7 |
| Track 7 | 28 | 35 | 35 | 14 |
| Track 8 | 21 | 35 | 35 | 21 |
| Track 9 | 14 | 35 | 35 | 28 |
| Track 10 | 7 | 35 | 35 | 35 |

|←— — — — — — — 112 — — — — — —→|

FIG. 4
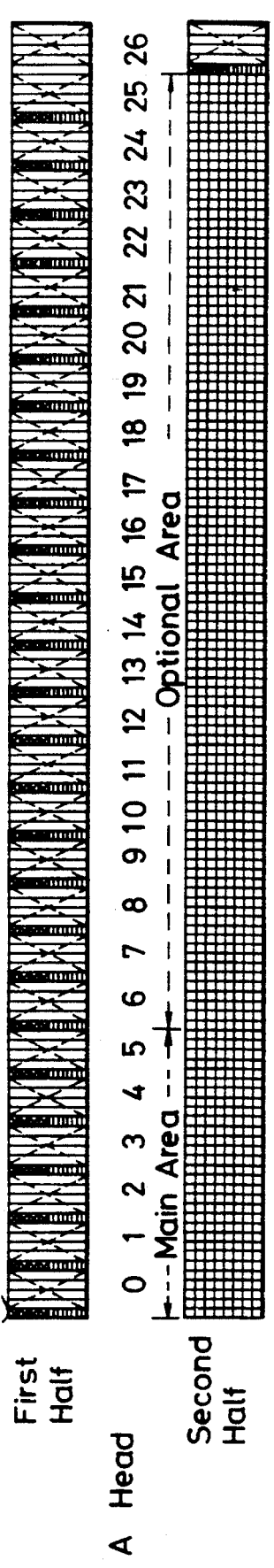
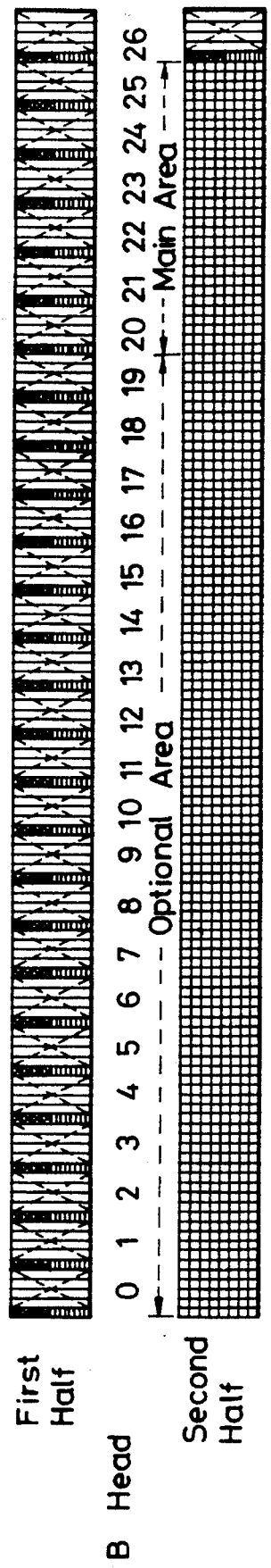

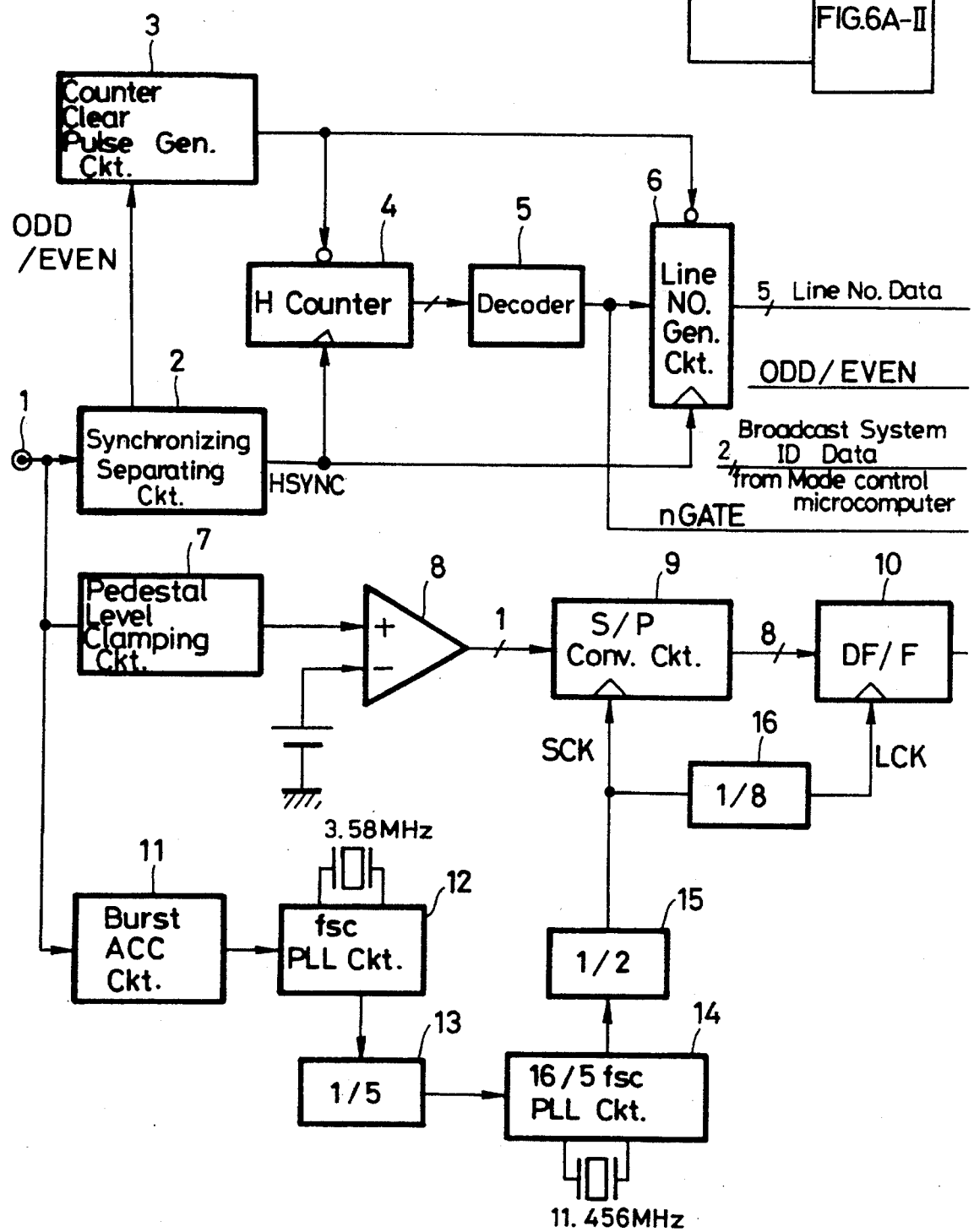
FIG. 6A-I

FIG. 6A-II
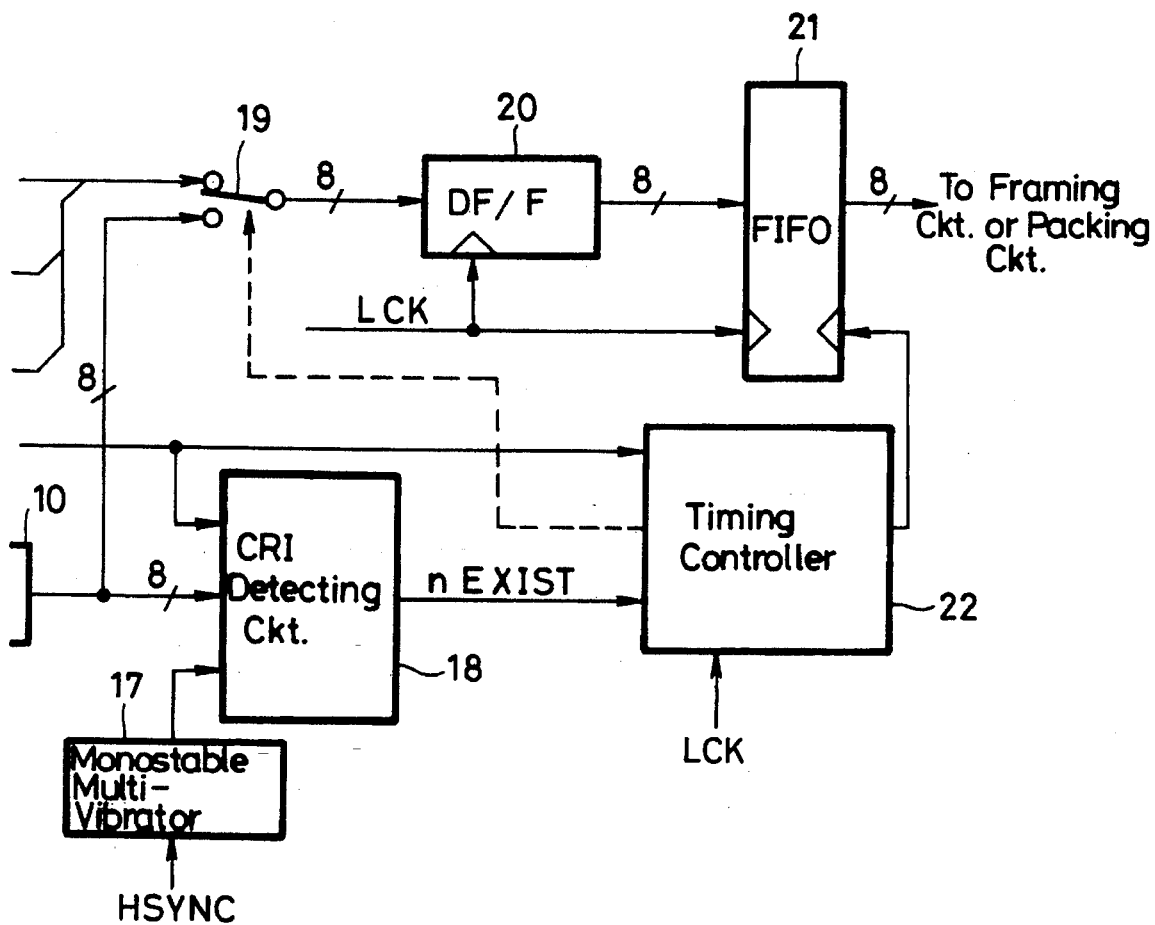
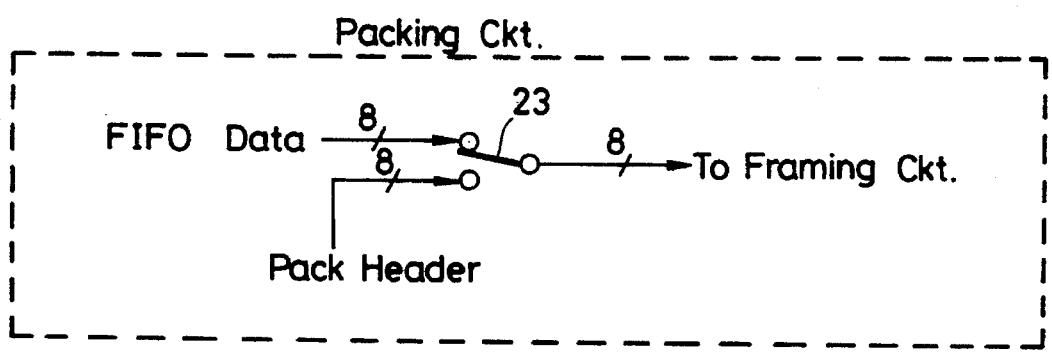

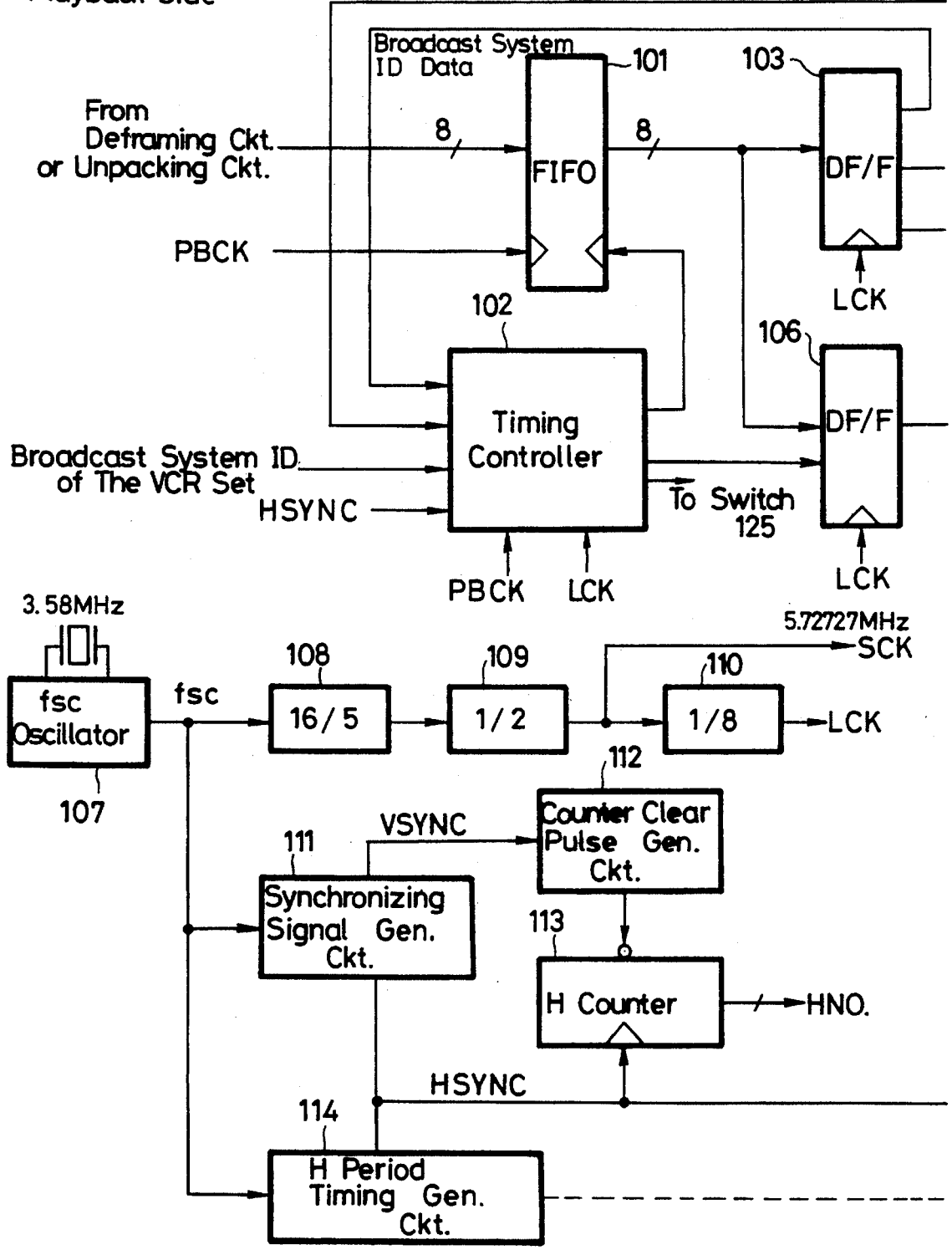

FIG. 6B-II
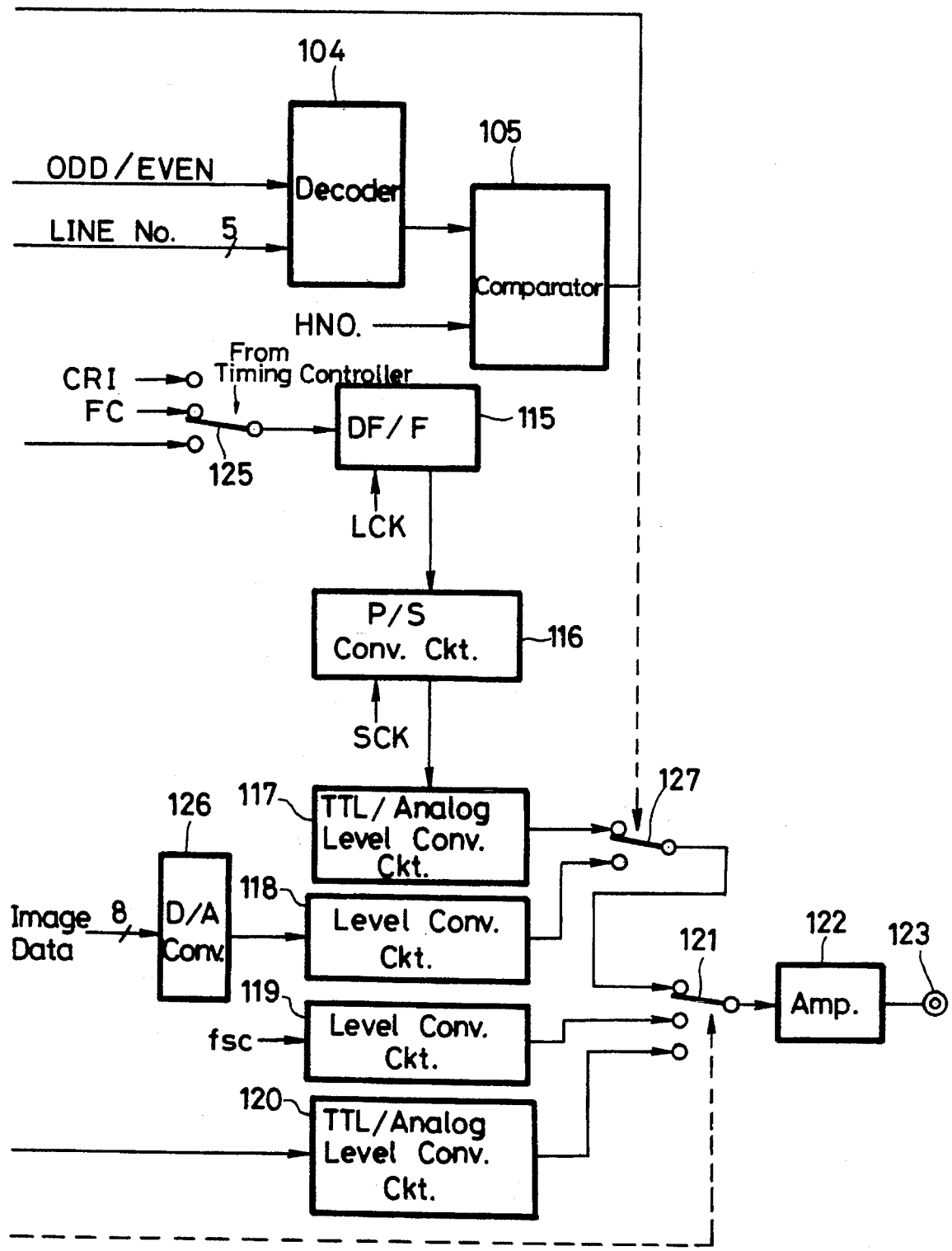

JAPAN  5.727272MHz(364tH)
Frame code-E5(JAPAN)
MAX 560bytes

| | | | | |
|---|---|---|---|---|
| Track 1 | 35 | 35 | 35 | 7 |
| Track 2 | 28 | 35 | 35 | 14 |
| Track 3 | 21 | 35 | 35 | 21 |
| Track 4 | 14 | 35 | 35 | 28 |
| Track 5 | 7 | 35 | 35 | 35 |
| Track 6 | 35 | 35 | 35 | 7 |
| Track 7 | 28 | 35 | 35 | 14 |
| Track 8 | 21 | 35 | 35 | 21 |
| Track 9 | 14 | 35 | 35 | 28 |
| Track 10 | 7 | 35 | 35 | 35 |

| Pack No. \ Track No. | 1 | 2 | 3 | 4 | 5 | 6 | 7 | 8 | 9 | 10 |
|---|---|---|---|---|---|---|---|---|---|---|
| 50+ | ▨ | T23 | ▨ | T47 | ▨ | T71 | ▨ | T23 | ▨ | FFh |
|  | ▨ | T22 | ▨ | T46 | ▨ | T70 | ▨ | T22 | ▨ | FFh |
|  | ▨ | T21 | ▨ | T45 | ▨ | T69 | ▨ | T21 | ▨ | FFh |
| 50 | ▨ | T20 | ▨ | T44 | ▨ | T68 | ▨ | T20 | ▨ | FFh |
|  | ▨ | · | ▨ | · | ▨ | · | ▨ | · | ▨ | · |
|  | ▨ | · | ▨ | · | ▨ | · | ▨ | · | ▨ | · |
|  | T47 | · | T71 | · | T23 | · | T47 | · | T71 | · |
|  | T46 | · | T70 | · | T22 | · | T46 | · | T70 | · |
| 45 | T45 |  | T69 |  | T21 |  | T45 |  | T69 |  |
|  | T44 |  | T68 |  | T20 |  | T44 |  | T68 |  |
|  |  | · |  | · |  | · |  | · |  | · |
|  |  | · |  | · |  | · |  | · |  | · |
|  |  | · |  | · |  | · |  | · |  | · |
| 40 |  | · |  |  |  |  |  | · |  |  |
|  |  |  |  |  |  |  |  |  |  |  |
|  |  | · |  |  |  |  |  | · |  |  |
|  |  | · |  |  |  |  |  | · |  |  |
| 35 |  | · |  |  |  |  |  | · |  |  |
|  |  | T3 |  |  |  |  |  | T3 |  |  |
|  |  | T2 |  |  |  |  |  | T2 |  |  |
|  |  | T1 |  |  | · |  |  | T1 |  |  |
| 30 |  | T0 |  |  | · |  |  | T0 |  |  |
|  |  | T71 |  |  | · |  |  | T71 |  |  |
|  |  | T70 |  |  | · |  |  | T70 |  |  |
|  |  | T69 |  |  | T3 |  |  | T69 |  |  |
|  |  | T68 |  |  | T2 |  |  | T68 |  |  |
| 25 |  | · |  |  | T1 |  |  | · |  |  |
|  |  | · |  |  | T0 |  |  | · |  |  |
|  |  | · |  |  | T71 |  |  | · |  |  |
|  |  | · |  |  | T70 |  |  | · |  |  |
| 20 |  |  |  |  | T69 |  |  |  |  |  |
|  |  |  |  |  | T68 |  |  |  |  |  |
|  |  |  |  |  | · |  |  |  |  |  |
|  |  |  |  |  | · |  |  |  |  |  |
|  |  |  |  |  | · |  |  |  |  |  |
| 15 |  |  |  |  |  |  |  |  |  |  |
|  |  | · |  | · |  | · |  | · |  | · |
|  |  | · |  | · |  | · |  | · |  | · |
|  |  | · |  | · |  | · |  | · |  | · |
| 10 |  | · |  | · |  | · |  | · |  | · |
|  |  | T51 |  | T3 |  | T27 |  | T51 |  | FFh |
|  |  | T50 |  | T2 |  | T26 |  | T50 |  | FFh |
|  | · | T49 | · | T1 | · | T25 | · | T49 | · | FFh |
|  | · | T48 | · | T0 | · | T24 | · | T48 | · | FFh |
| 5 | · | ▨ | · | ▨ | · | ▨ | · | ▨ | · | ▨ |
|  | · | ▨ | · | ▨ | · | ▨ | · | ▨ | · | ▨ |
|  | T3 | ▨ | T27 | ▨ | T51 | ▨ | T3 | ▨ | T27 | ▨ |
|  | T2 | ▨ | T26 | ▨ | T50 | ▨ | T2 | ▨ | T26 | ▨ |
|  | T1 | ▨ | T25 | ▨ | T49 | ▨ | T1 | ▨ | T25 | ▨ |
| 0 | T0 | ▨ | T24 | ▨ | T48 | ▨ | T0 | ▨ | T24 | ▨ |

Legend:
- ▨ main area
- T0  TEXT HEADER PACK
- T1  TELETEXT PACK (This pack contains ID code)
- T71 TELETEXT PACK (This pack contains terminate code)
- FFh No. Information pack

FIG. 8C

TDP: Total number of TELETEXT PACK which follow this TBXT HEADER PACK

TEXT TYPE:
- 0 = Name
- 1 = Memo
- 2 = Station
- 3 = Model
- 6 = Operator
- 7 = Sub-title
- 8 = Outline
- 9 = Teletext

TEXT HEADER PACK

| | MSB | | | | | | | LSB |
|---|---|---|---|---|---|---|---|---|
| PC 0 | 0 | 1 | 1 | 1 | 0 | 0 | 0 | 0 |
| PC 1 | | | TDP | | | | | |
| PC 2 | | TEXT TYPE | | | 1 | 1 | 1 | 1 |
| PC 3 | 1 | 1 | 1 | 1 | 1 | 1 | 1 | 1 |
| PC 4 | 1 | 1 | 1 | 1 | 1 | 1 | 1 | 1 |

TELETEXT PACK

| | MSB | | | | | | | LSB |
|---|---|---|---|---|---|---|---|---|
| PC 0 | 0 | 1 | 1 | 1 | 0 | 0 | 1 | 1 |
| PC 1 | | | | | | | | |
| PC 2 | | teletext data etc. | | | | | | |
| PC 3 | | | | | | | | |
| PC 4 | | | | | | | | |

No. INFORMATION PACK

| | MSB | | | | | | | LSB |
|---|---|---|---|---|---|---|---|---|
| PC 0 | 1 | 1 | 1 | 1 | 1 | 1 | 1 | 1 |
| PC 1 | 1 | 1 | 1 | 1 | 1 | 1 | 1 | 1 |
| PC 2 | 1 | 1 | 1 | 1 | 1 | 1 | 1 | 1 |
| PC 3 | 1 | 1 | 1 | 1 | 1 | 1 | 1 | 1 |
| PC 4 | 1 | 1 | 1 | 1 | 1 | 1 | 1 | 1 |

TERMINATE CODE:
- 0 0 1 1 1 1 1 1 (Japanese teletext system)
- 0 1 1 1 1 1 1 1 (NABTS teletext system)
- 1 0 1 1 1 1 1 1 (ANTIOP teletext system)
- 1 1 1 1 1 1 1 1 (UK teletext system)

"B" Head Clogged

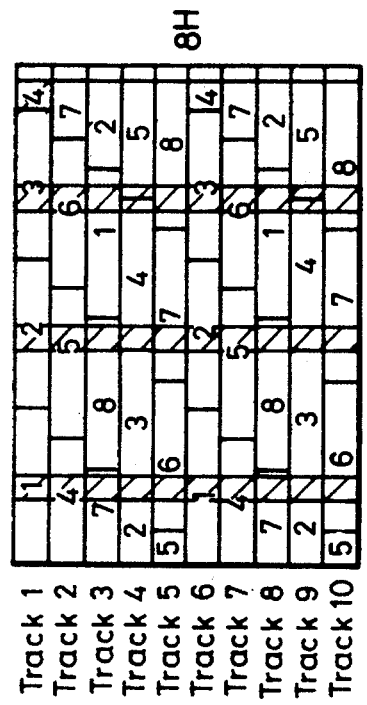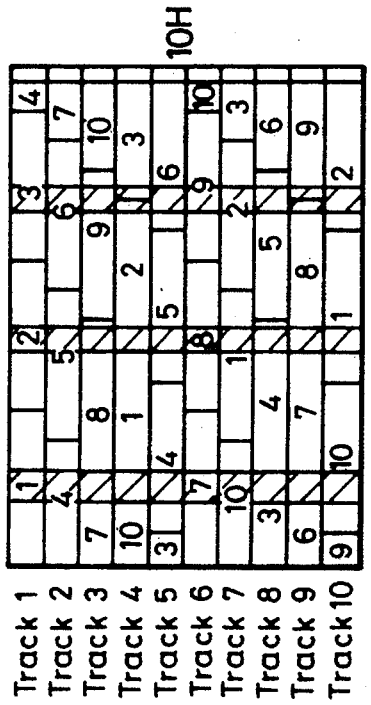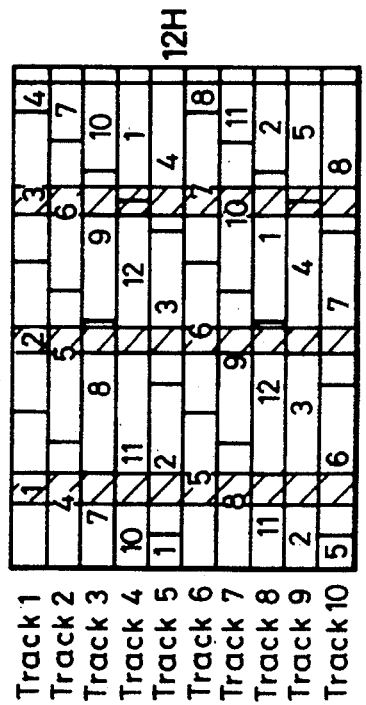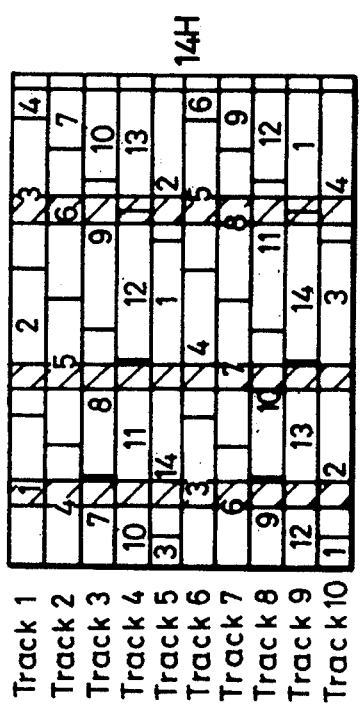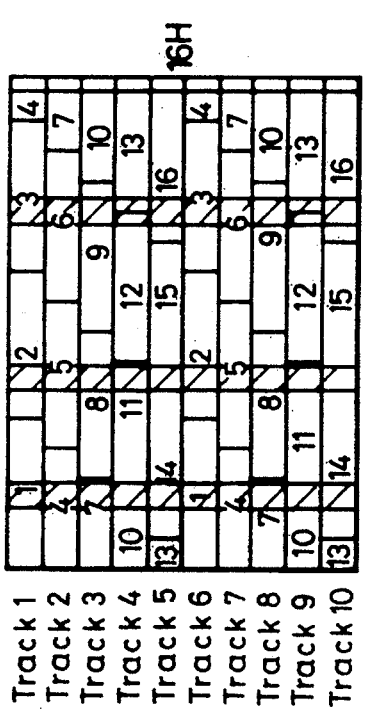
FIG. 11
Side Scratch

FIG. 13

U.K, GERMANY 6.937500MHz(4444tH)
Frame code—E4
MAX 1376bytes

| Track | | | | | | | |
|---|---|---|---|---|---|---|---|
| Track 1 | 43 | 43 | 43 | 43 | 43 | 26 | 1 |
| Track 2 | 17 | 43 | 43 | 43 | 43 | 43 | 9 |
| Track 3 | 34 | 43 | 43 | 43 | 43 | 35 | |
| Track 4 | 8 | 43 | 43 | 43 | 43 | 43 | 18 |
| Track 5 | 25 | 43 | 43 | 43 | 43 | 27 | |
| Track 6 | 42 | 43 | 43 | 43 | 43 | 43 | 10 |
| Track 7 | 16 | 43 | 43 | 43 | 43 | 36 | |
| Track 8 | 33 | 43 | 43 | 43 | 43 | 43 | 19 |
| Track 9 | 7 | 43 | 43 | 43 | 43 | 28 | 2 |
| Track 10 | 24 | 43 | 43 | 43 | 43 | 43 | |
| Track 11 | 41 | 43 | 43 | 43 | 43 | 28 | |
| Track 12 | 15 | 43 | 43 | 43 | 43 | 43 | 11 |

JAPAN
| 35 |

NORTH AMERICA
| 34 |

0
0
0
0
0
0
0
0

U.K, GERMANY
| 43 |

FRANCE
| 38 |

| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |

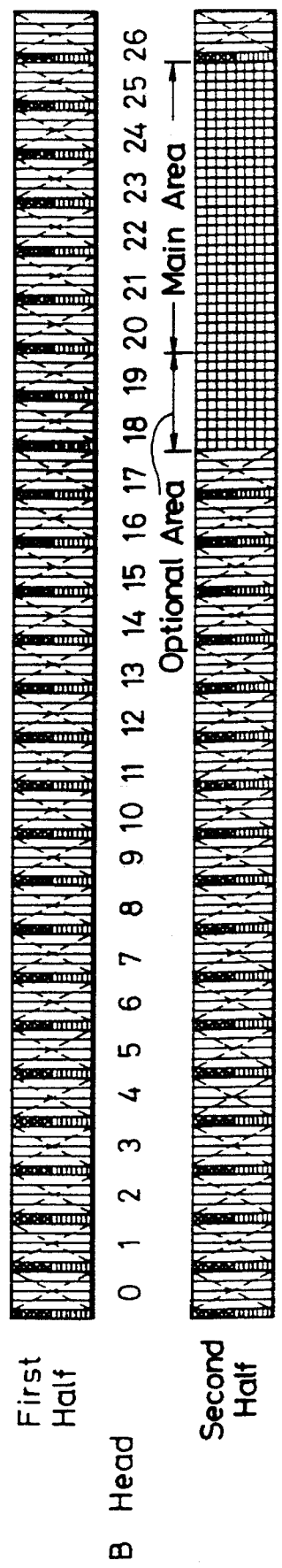
FIG. 15

TELETEXT SIGNAL RECORDING AND REPRODUCING APPARATUS

BACKGROUND OF THE INVENTION

1. Field of the Invention

This invention relates to a video tape recorder capable of recording and reproducing teletext signals together with video signals.

2. Description of Related Art

It is known to broadcast teletext data multiplexed with a broadcast television signal. The teletext data may represent characters for providing information such as news, weather forecasts, traffic information, quiz programs, characters to be superimposed on the broadcast video picture and so forth. Moreover, it has been known since the end of 1985 to broadcast teletext data multiplexed with a broadcast television signal in which the teletext data represents graphic patterns and/or additional audio information as well as characters. The teletext data also may include codes representing bit-mapped graphics.

Teletext broadcasting systems are in operation in North America (the NABTS system), England and France, but there are minor differences among the respective systems. A teletext broadcasting system is also in operation in Japan, but the Japanese system differs from the systems just mentioned in that the Japanese system is capable of broadcasting teletext codes representing sound and Japanese characters, while the other systems are not. The term "teletext" originally arose with respect to the North American, English and French systems, which are all oriented toward transmitting text in a 26-character alphabet, but all of the teletext systems referred to above are fundamentally the same, and will therefore be collectively referred to herein as "teletext broadcasting" systems.

In order to prevent the teletext broadcast signal from disturbing the video and audio signal included in the television broadcast signal, the teletext broadcast signal is multiplexed in the vertical blanking period of the television broadcast signal. At the current time in the Japanese system, the teletext broadcast signal is included in 8 lines of each frame, namely lines 14, 15, 16, 21, 277, 278, 279 and 284. According to an existing standard, it is contemplated that up to 16 lines (lines 10–16, 21, 273–279 and 284) may be used.

According to standards for teletext broadcasting in the European countries, up to 32 lines may be used for the teletext broadcast signal (lines 7–22 and 320–35), but in practice, each broadcasting station uses different ones of these lines for the teletext broadcast signal, while using others of these lines for a VPS signal, a test signal or the like.

FIG. 16 illustrates a format in which teletext broadcast information is provided in a video line according to the Japanese teletext broadcasting system. As shown in FIG. 16, the teletext signal consists of 296 binary bits per line, with "0" values represented as the pedestal level, and "1" values represented at 70% of the white level. The digital signal in each line includes a synchronizing portion and a data portion. The synchronizing portion includes a bit synchronizing code (also known as a Clock Run-In or "CR") which is provided for bit synchronization, and a byte synchronization code (also known as a Framing Code or "FC") which is provided for byte synchronization.

The data portion includes a prefix ("PFX"), information data and a check code. The prefix is composed of an 8-bit service identifying code ("SI/IN") which indicates whether the data is provided under a bit-mapped or "pattern" system, and a 6-bit packet control ("PC") which represents control information regarding transmission of the data portion. The prefix is followed by 176 bits (i.e., 22 bytes) of information data and 82 bits are added as a check code. The North American, English and French teletext systems are conceptually the same as the Japanese teletext system just described but differ from the Japanese system in some details.

A single teletext program requires approximately several kilobytes of data, depending on program content. Accordingly, since at most 176 bits are transmitted per line and dozens of programs are transmitted via one channel, each teletext program is transmitted at an interval of about 20 to 30 seconds.

In currently available teletext broadcasting systems, the teletext information can be viewed by means of a teletext broadcast tuner or a television receiver with teletext reception capability, either of which decodes the teletext data into displayable form. Although the decoded (i.e., displayable) teletext information can be recorded on a video tape recorder (VTR) or the like, raw teletext data that has not yet been decoded cannot be recorded by a conventional analog VTR because of the high clock rate (5.7 Mhz to 6.9 Mhz) of the teletext data within the television broadcast signal.

As indicated above, teletext broadcast information cannot be recorded in the form in which the information is broadcast by existing home-use analog VTRs or similar devices. On the other hand, if it is desired to decode and then record the teletext information, devices such as a teletext decoder IC, a large capacity memory, a Kanji ROM (read only memory), a control microprocessor and the like must be included in the VTR. However, and particularly in the case of a home-use VTR, the resulting increase in cost and the space required for the additional components are significant.

Even if the cost of such a home-use VTR can be reduced by mass-production or the like, there is an additional difficulty in that the VTR must be placed in standby mode for approximately 20 to 30 seconds while recording one teletext program. Accordingly, during the period of time in which the teletext information is recorded, the VTR must be kept in a stop mode or previously received information must be recorded during that time. Further, the above-mentioned typical 20 to 30 second teletext program period is only an average figure, and is subject to substantial fluctuation, varying from about 2 seconds in some cases to upwards of 30 seconds in other cases.

Moreover, there is a complete lack of synchronization between the standard recording rate for video and audio, which is 50 Hz or 60 Hz, and the recording rate for a decoded teletext program, which is once per 20 to 30 seconds. As a result, it is not possible to establish a correlation between the two recording rates.

As a result of the foregoing circumstances, if it is contemplated to record video, audio and teletext information in respective areas on one recording track, either video and audio on one hand, or teletext on the other hand must be given priority. However, if video and audio recording is given priority, then it is possible that the teletext recording area will be left blank, whereas if recording of teletext is emphasized, it is possible that the video and audio areas will be left blank. For this reason, the conventional method of recording teletext information includes decoding the teletext information and recording the same in the form of video and audio information. However, this approach suffers from the drawback that the accompanying television program broadcast simultaneously with the teletext information cannot be recorded.

Just as audio signal recording has evolved from analog recording on magnetic tape cassettes to digital audio tape recording, it is also now being proposed that analog video tape recording formats, such as 8 mm and VHS formats, are to be succeeded by digital video tape recording. It is contemplated by the present invention to take advantage of the 13.5 Mhz fundamental sampling rate used in digital video tape recording, which can conveniently accommodate the clock rate used for multiplexed teletext information broadcasting. It is further contemplated to record video, audio and undecoded teletext data together in a single track. Such an approach would avoid the aforementioned disadvantages encountered in attempting to record teletext information by analog video tape recorders.

By recording the teletext data without decoding the same, i.e., in the same form in which it is broadcast, increases in the manufacturing cost of the recorder, and the extent of the tape track area used for recording the teletext data, can be reduced in comparison to a system in which decoded teletext data is recorded. Further, because of the relatively small tape track area to be occupied by the non-decoded teletext data, it will become commercially feasible to provide product offerings in which teletext data is decoded by a teletext broadcasting television receiver.

An important advantage of digital video tape recording is that the same 13.5 Mhz sampling frequency can be used for both the 60 Hz and 50 Hz television signal formats. Accordingly, and unlike conventional analog VTRs, the same rotation rate of the rotary magnetic head drum can be used regardless of whether the digital video tape recorder is to be used for recording in the 60 Hz or the 50 Hz format. Although digital recording of the 60 Hz format requires 10 tracks per frame and recording in the 50 Hz system requires 12 tracks per frame, so that different tape lengths are used per frame, nevertheless other parameters, such as track pitch, track width and so on can be made the same for digital recording of both the 60 Hz and the 50 Hz formats.

It will be understood that the television tuning circuitry to be provided in a digital VTR varies depending on the country in which the DVTR is to be used, and the technique for handling teletext recording also must vary. It will also be appreciated that mutually different tape recording formats result from recording signals in the 60 Hz and the 50 Hz formats. However, tapes recorded in the 60 Hz format in one country, such as the U.S., can be reproduced in another country such as Japan, that also uses the 60 Hz format. Accordingly, it is desirable to provide only two different teletext recording formats, respectively corresponding to the 60 Hz and 50 Hz television signal formats. However, it is to be noted that there are presently four different teletext broadcasting formats, respectively for Japan, North America (NABTS) the U.K. and France, having parameters as shown on table 1 below.

TABLE 1

| ITEM | Japan | North America (NABTS) | U.K. | France |
| --- | --- | --- | --- | --- |
| clock frequency | 364 $f_H$ | 364 $f_H$ | 444 $f_H$ | 397 $f_H$ |
| full length of data line | 296 bits | 288 bits | 360 bits | 320 bits |
| clock run-in | 16 bits | 16 bits | 16 bits | 16 bits |
| framing | 8 bits | 8 bits | 8 bits | 8 bits |

TABLE 1-continued

| ITEM | Japan | North America (NABTS) | U.K. | France |
| --- | --- | --- | --- | --- |
| code (length) prefix | 14 bits | 40 bits | 16 bits | 16 to 40 bits |
| data block | 176 bits | 224 bits | 320 bits | 240 to 280 bits |
| suffix | 82 bits | 16 bits | 0 | 0 |
| framing code (value) | 11100101 (E5h) | 11100111 (E7H) | 11100100 (E4h) | 11100111 (E7h) |

It is also desirable that a teletext recording system be sufficiently flexible to accomodate future expansion of teletext data broadcasting using more than the 8 lines per frame currently used in Japan, for example.

Another consideration with respect to recording teletext information on tape, and reproducing the information from the tape, is dealing with "drop-outs" to which tape is inherently subject. Even though some error correction capability can be provided by way of a check code or the like, it is also necessary to pay special attention to the possibility of burst errors, such as may be caused by a drop-out or the like. When the teletext information represents alphabet characters, the risk of data loss is not great, but when Japanese characters such as ideographs are represented by the data, even the loss of a single word of the teletext data may make it impossible to recover a Japanese character.

Furthermore, since home-use digital VTRs will undoubtedly use data compression techniques in order to conserve the required length of tape, it should be anticipated that compression technology will continue to advance, so that, for example, a frame of data that can currently be recorded using 10 tracks may in the future be recorded using only 5 tracks. Therefore, it is desirable for a teletext data recording format to be sufficiently flexible to accommodate future improvements in compression technology.

OBJECTS AND SUMMARY OF THE INVENTION

Accordingly, it is an object of the present invention to provide a video tape recorder which records broadcast teletext data without decoding, i.e., in the same form in which the teletext data is broadcast. In particular, it is another object of the invention to provide two teletext recording formats, respectively corresponding to the 60 Hz and 50 Hz television broadcast formats, such that each of the four most widely used teletext broadcasting formats can be recorded using one or the other of the two teletext recording formats.

It is a further object of the invention to provide a video tape recorder which records broadcast teletext data in a format that is sufficiently flexible to accommodate future expansions of teletext broadcasting systems and future improvements in video data compression such that the number of tape tracks required per frame of video data is reduced by half.

It is yet a further object of the invention to provide a teletext recording and reproducing apparatus that is highly tolerant of drop-outs caused by head clogs or sideways scratches on the surface of the tape.

According to an aspect of the present invention, there is provided an apparatus for recording a teletext signal including means for receiving a broadcast signal that includes a video portion and a teletext data signal transmitted in multiplexed fashion with the video portion, video signal recording means for recording the video portion of the received broadcast signal as digital video data on a recording medium, means for extracting the teletext data signal from the received broadcast signal to provide extracted teletext data composed of binary data bits, and teletext data recording means for recording the binary bits of the extracted teletext data on the recording medium.

According to another aspect of the invention, the teletext data signal transmitted with the video portion of the broadcast signal includes a bit synchronizing code that is not recorded on the recording medium. According to still another aspect of the invention, the teletext data signal transmitted with the video portion of the broadcast signal includes a byte synchronizing code and the apparatus includes means for detecting the byte synchronizing code included in the teletext data signal, means for generating a country identification number on the basis of the detected byte synchronizing code, means for generating a line number and field number in response to the broadcast television signal, and means for recording the country identification number, the line number and the field number on the recording medium together with the binary data bits of the extracted teletext data. According to this aspect of the invention, the byte synchronizing code is not recorded on the recording medium.

According to still further aspects of the invention, the recording medium is a magnetic tape, and the video signal recording means and the teletext data recording means include a plurality of rotary magnetic heads which scan the magnetic tape to form a plurality of recording tracks in which the digital video data and the binary data bits of the extracted teletext data are recorded.

According to still another aspect of the invention, the binary data bits of the extracted teletext data are recorded in the plurality of recording tracks in the form of data bytes interspersed with the digital video data.

According to yet another aspect of the invention, there is provided apparatus for recording teletext signals in a plurality of recording tracks formed on a magnetic tape, including means for receiving a broadcast video signal which includes a predetermined standard quantity of teletext data in each of certain predetermined lines in each frame of the broadcast video signal, means for extracting the teletext data from the received broadcast signal, and means for recording a predetermined fixed quantity of the extracted teletext data in each of the plurality of recording tracks formed on the magnetic tape, with the predetermined fixed quantity of the extracted teletext data recorded in each of the recording tracks not being an integral multiple of the predetermined standard quantity of teletext data included in each of the lines of the broadcast video signal.

According to still another aspect of the invention the teletext signal recording apparatus includes means for forming within each of the recording tracks a tracking data area in which tracking data is recorded, an audio data area in which audio data is recorded, a video data area in which video data is recorded, and an auxiliary data area within the video data area for recording information related to the video data, with the extracted teletext data being recorded in the auxiliary data area.

According to still another aspect of the invention, the extracted teletext data is recorded in the form of data bytes interspersed with the video data on the magnetic tape. In accordance with yet another aspect of the invention the teletext data included in each frame of the broadcast video signal is extracted and repeatedly recorded in a plurality of tracks in the form of data bytes interspersed with the video data.

According to still a further aspect of the invention, there is provided apparatus for reproducing a teletext signal, including means for reproducing a teletext signal from a recording medium on which the teletext signal was recorded with a video signal, means for reproducing the video signal from the recording medium, and means for combining the reproduced teletext signal and the reproduced video signal to form an output video signal which has the teletext signal inserted in selected lines of the output video signal.

According to further aspects of the invention, the recording medium is a magnetic tape, the means for reproducing the teletext signal and the means for reproducing the video signal include a plurality of magnetic heads which scan the magnetic tape, the output video signal is a composite video signal, and the selected lines of the output video signal within which the reproduced teletext signal is inserted are within a vertical blanking period of the output video signal.

With an apparatus for recording a teletext signal in accordance with the invention, two teletext tape recording formats are provided, respectively corresponding to the 60 Hz and 50 Hz video broadcast formats, such that each of the major teletext broadcasting formats can be accommodated by one or the other of the teletext tape recording tape formats.

Further, since the broadcast teletext data are recorded frame by frame, the tape-recorded teletext data can be edited in the same manner as tape-recorded video and audio data.

Also, even in case of future expansions of teletext broadcasting systems, previously tape-recorded teletext data will be reproducible by newly-developed video tape recorders.

In addition, the country of origin of recorded teletext data can be readily detected so that, for example, if a tape recorded in the U.S. is reproduced in Japan, video and audio data in the 60 Hz format can be reproduced while erroneous reproduction of the recorded teletext data can be prevented.

Moreover, since the teletext recording approach of the present invention allows all teletext broadcast in a television channel to be recorded, the viewer can select desired teletext programs for reproduction after the programs have been recorded.

Furthermore, since the teletext recording format of the present invention provides for recording of broadcast teletext information as digital data, a teletext broadcasting system can be used for distributing data from data bases by providing a digital interface or the like between a personal computer and the teletext broadcasting system.

Also, by increasing the commercial feasibility of audio and video equipment with the necessary processing circuitry and memories for teletext recording, while minimizing the cost and space requirements for the same, growth and variation in teletext broadcasting systems are encouraged.

The above, and other objects, features and advantages of the present invention will become apparent from the following detailed description of illustrative embodiments thereof which is to be read in conjunction with the accompanying drawings, in which like reference numerals are used to identify the same or similar parts in the several views.

BRIEF DESCRIPTION OF THE DRAWINGS

FIG. 4 diagrammatically shows utilization of auxiliary data areas for recording of teletext data within the buffering units and sync blocks of two recording tracks;

FIG. 6A (formed of FIGS. 6A-I and 6A-II drawn on two sheets of drawing so as to permit the use of a suitably large scale) is a schematic block diagram of circuitry for performing recording processing with respect to teletext data in accordance with the present invention;

FIG. 6B (formed of FIGS. 6B-I and 6B-II drawn on two sheets of drawing so as to permit the use of a suitably large scale) is a schematic block diagram of circuitry for performing reproducing processing of recorded teletext data and for multiplexing reproduced teletext data with reproduced video data in accordance with the present invention;

FIGS. 8A-8C schematically illustrate an alternative manner in which a frame of teletext data is recorded in the ten tracks used for recording one frame of a broadcast television signal;

FIG. 11 schematically illustrates the effect, with respect to lines of teletext data recorded as shown in FIG. 8, of drop-outs resulting from "side scratches";

FIG. 13 schematically illustrates a manner of distributing lines of teletext information, provided within a broadcasting signal according to the U.K. and German teletext broadcasting formats, among 12 tracks in which a frame of a U.K./German video signal is recorded;

FIG. 14 illustrates a manner of adapting a recording format for Japanese teletext information to the recording of teletext information broadcast in the North American format, and also illustrates adaptation of a recording format for teletext information in the U.K. and German formats to recording of teletext information broadcast in accordance with the French format;

FIG. 15 is an illustration of the utilization of sync blocks within buffering units of two tracks for recording of teletext information, similar to FIG. 4, but also showing how auxiliary areas of the sync blocks may be used to accommodate expanded versions of the European teletext broadcasting systems;

DETAILED DESCRIPTION OF THE PREFERRED EMBODIMENTS

Figure 18:
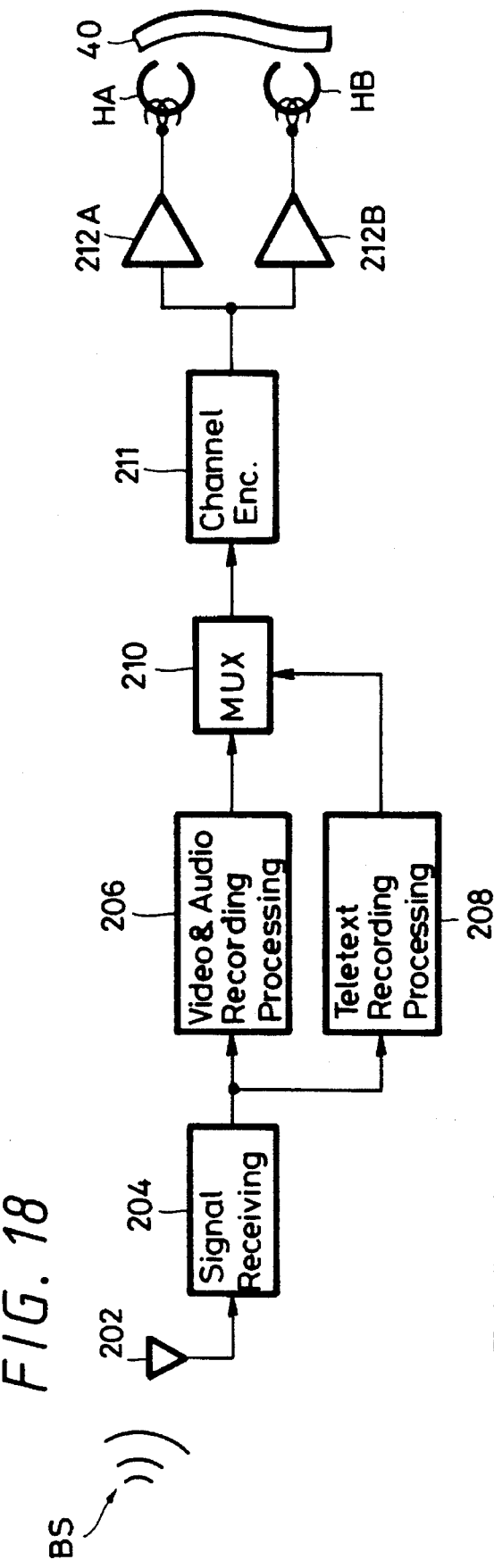
FIG. 18 is a generalized block diagram of the recording system of a digital VTR which embodies the teletext information recording and reproducing apparatus of the present invention.
Figure 19:
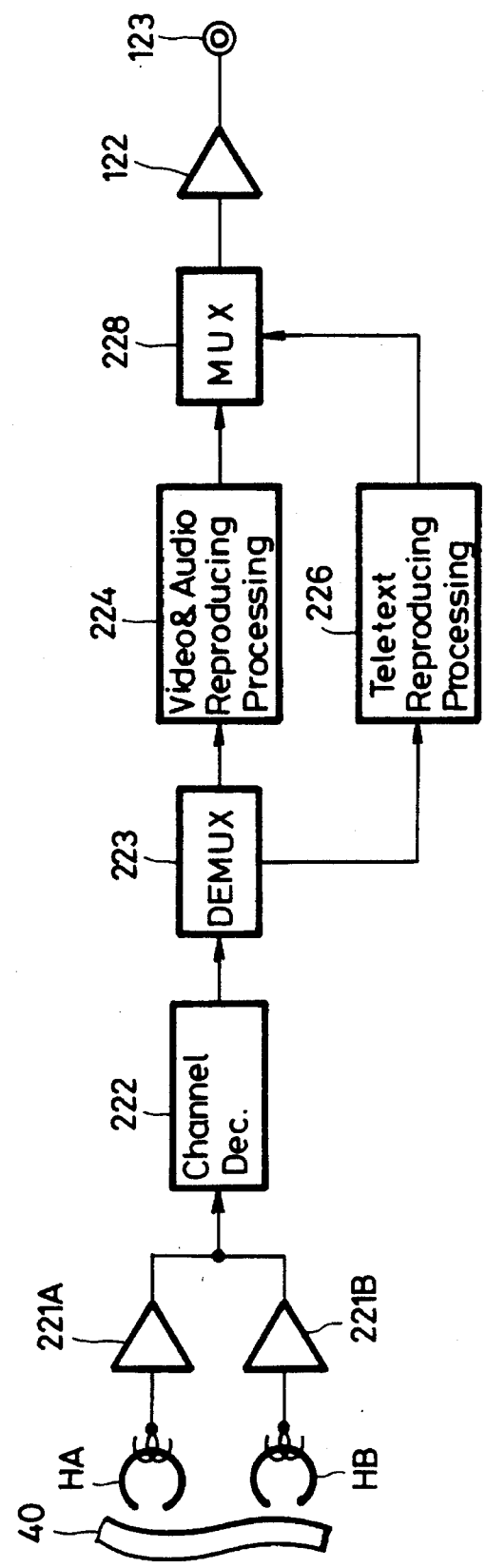
FIG. 19 is a generalized block diagram of the reproducing system of a digital VTR which embodies the teletext information recording and reproducing apparatus of the present invention.
Figure 20:
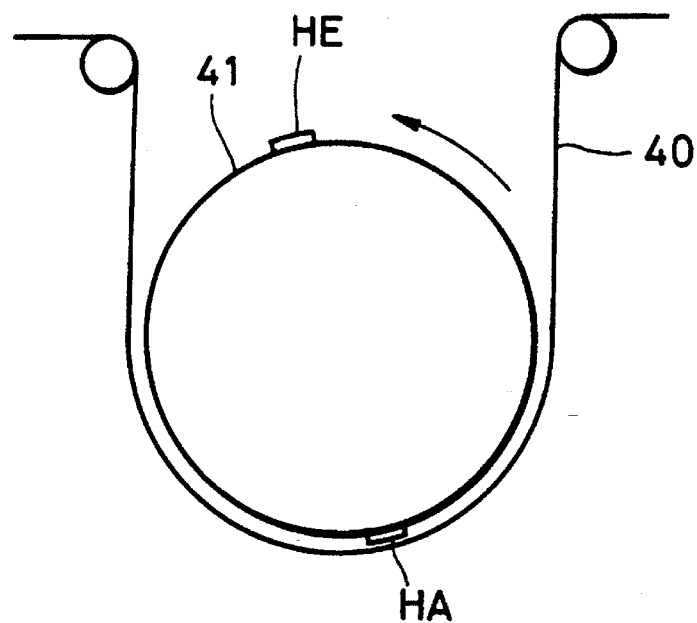
FIG. 20 illustrates a rotary head drum that is part of the digital VTR illustrated in FIGS. 18 and 19.

There will first be provided, with reference to FIGS. 18–20, an overview of a digital video tape recorder which embodies teletext information recording and reproducing apparatus in accordance with the present invention.

As shown in FIG. 18, a recording system 200 of a digital VTR includes a signal receiving circuit 204 which receives a broadcast television signal BS by way of an antenna 202. It should be understood that the broadcast television signal BS may be, for example, a conventional television signal broadcast from a terrestrial station and including conventional teletext information, according to the Japanese teletext broadcasting standard, for example. Alternatively, the signal BS may be a direct broadcast satellite signal. As another alternative, the signal receiving circuit 204 may receive a television signal by way of a conventional coaxial cable (not shown).

The signal receiving circuit 204 provides the received broadcast television signal in common to a video and audio recording processing circuit 206 and a teletext recording processing circuit 208. The video and audio recording processing circuit 206 may be of a known type, whereas the teletext recording processing circuit 208 will be described in detail below. The video and audio recording processing circuit 206 provides processed (e.g., digitized and compressed) video and audio signals to a multiplexing circuit 210. The teletext recording processing circuit 208 extracts teletext information from the received broadcast signal, processes the extracted teletext information, and provides a processed teletext signal to the multiplexing circuit 210. The multiplexing circuit 210 combines the processed video and audio signal and the processed teletext signal in a manner to be described below, and outputs the combined signal for recording on a magnetic tape 40 by way of a channel encoding circuit 211, recording amplifiers 212A and 212B, and recording heads HA and HB, which respectively correspond to the recording amplifiers 212A and 212B.

FIG. 19 shows the reproducing system 220 of the digital VTR. The reproducing system 220 includes the same magnetic heads HA and HB shown in FIG. 18. The heads HA and HB reproduce the combined signal which has been recorded on the tape 40 and provide the reproduced combined signal to a demultiplexing circuit 223 by way of respective reproducing amplifiers 221A and 221B and a channel decoding circuit 222.

The demultiplexing circuit 223 provides reproduced video and audio data to a conventional video and audio reproducing processing circuit 224 which, for example, decompresses and digital-to-analog converts the video and audio data to produce analog video and audio signals. The demultiplexing circuit 223 also provides reproduced teletext data to a teletext reproducing processing circuit 226 which will be described in detail below. The teletext reproducing processing circuit 226 reformats the reproduced teletext data and converts the reproduced teletext data to an appropriate form for output. The processed teletext data and the analog video and audio signals output from the video and audio reproducing processing circuit 224 are both provided to a multiplexing circuit 228 (to be described below) which combines the video and audio analog signals and processed teletext signal so as to provide a reconstituted television signal like the broadcast signal BS originally received at the recording system 200. The reconstituted output signal including the teletext information is provided at an output terminal 123 by way of an amplifier 122. According to an embodiment of the invention, the received broadcast signal BS and the reconstituted output signal provided at the output terminal 123 are a composite video signal.

Figure 21:
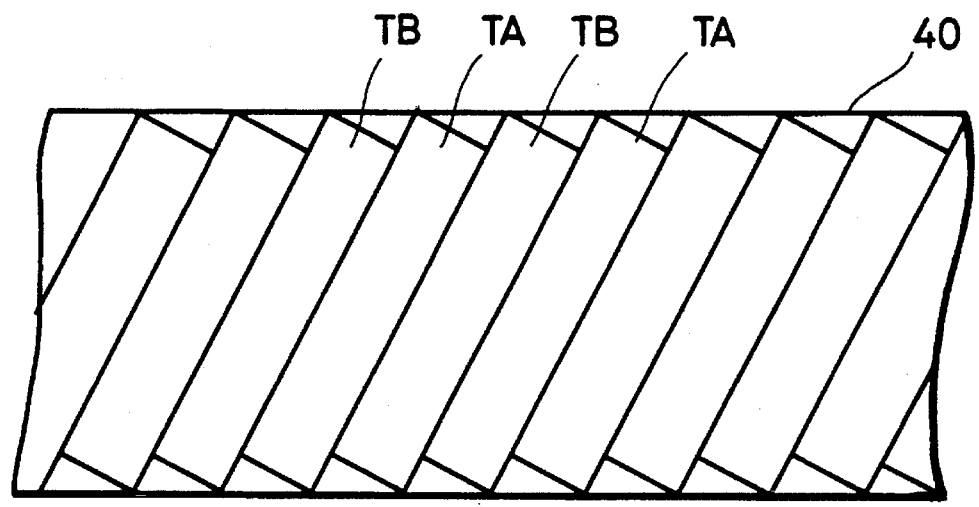
FIG. 21 illustrates the arrangement of recording tracks formed on a magnetic tape by the digital VTR of FIGS. 18–20.

FIG. 20 illustrates a rotary head drum 41 on which the magnetic heads HA and HB are mounted for forming oblique recording tracks while scanning the magnetic tape 40. An arrangement of the recording tracks on the tape 40 is illustrated in FIG. 21, in which reference characters TB indicate recording tracks formed by the magnetic head HB (sometimes referred to hereinafter as a "B" head) and the reference numerals TA indicate recording tracks formed by the recording head HA (sometimes hereinafter referred to as an "A" head). It will be observed that the heads HA and HB respectively form alternate ones of the oblique recording tracks on the magnetic tape 40.

Although the rotary head drum 41 of FIG. 20 is shown as having mounted thereon two diametrically opposed recording heads, it should be understood that it is also contemplated to provide, for example, two recording heads mounted closely together in a single head unit on the head drum 41, and it is further contemplated to use a number of heads, such as four heads, other than the number of heads shown in FIGS. 18–20.

Figure 1:
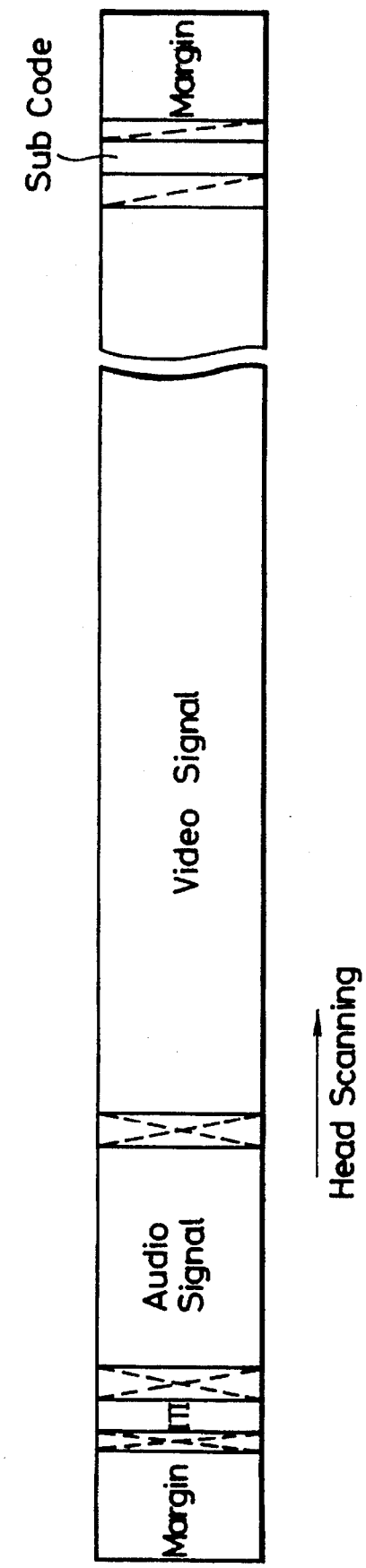
FIG. 1 illustrates a signal recording format in a recording track formed on a magnetic tape by a digital VTR which embodies a teletext signal recording and reproducing apparatus according to the present invention.

FIG. 1 illustrates a signal format used in the tracks shown in FIG. 21. As illustrated in FIG. 1, each of the tracks includes the following areas, proceeding from the start of the track: an initial margin area, an Insert and Track Information (ITI) area, an audio signal recording area, a video signal area in which a video signal is recorded, a sub code area, and an ending margin area. Between the respective areas, there are provided, for example, preambles, postambles and protective gaps.

Since the teletext broadcasting information is provided in the vertical blanking interval of the broadcast television signal, it is proposed according to the present invention to treat the teletext information as video auxiliary (VAUX) information. The VAUX information recording area included within the video signal area will now be described.

Figure 2:
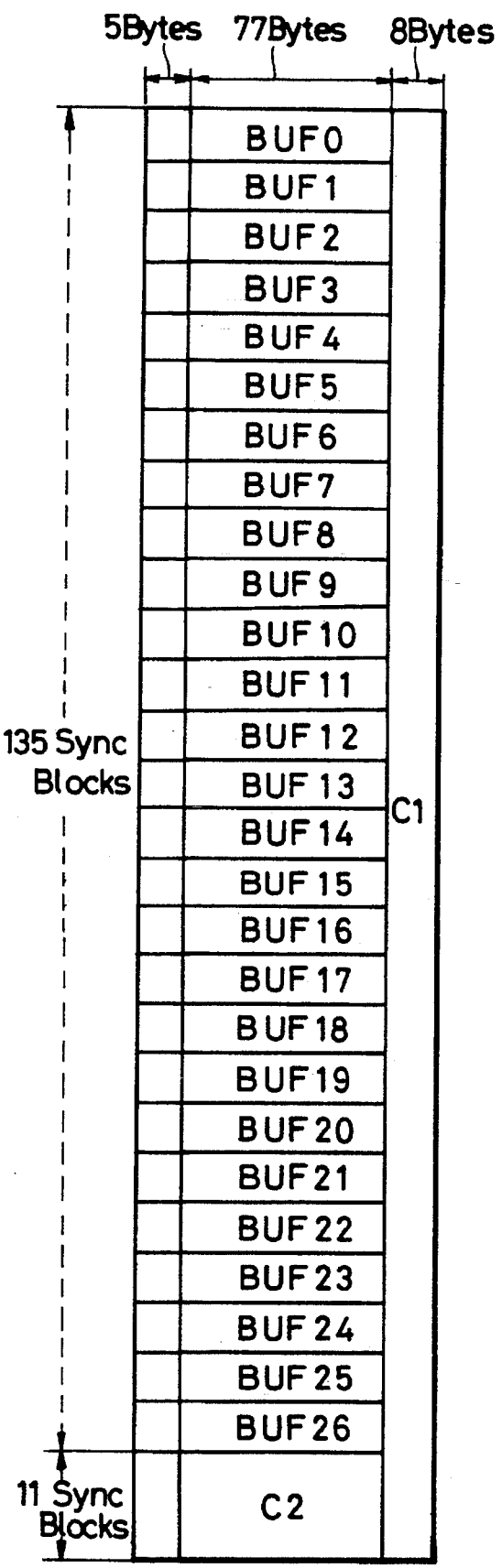
FIG. 2 illustrates a buffering unit and sync block recording arrangement within a video signal area of the recording track of FIG. 1.

FIG. 2 shows an arrangement in which the video data is recorded in the video signal area shown in FIG. 1. As shown in FIG. 2, the video signal area comprises 135 sync blocks used for data in addition to 11 sync blocks of vertical parity code C2. Eight bytes of horizontal parity code C1 are provided for each of the 135 data sync blocks and 11 C2 sync blocks. The 135 data sync blocks are arranged in 27 buffering units numbered from 0 to 26, and each including 5 of the data sync blocks.

Figure 3:
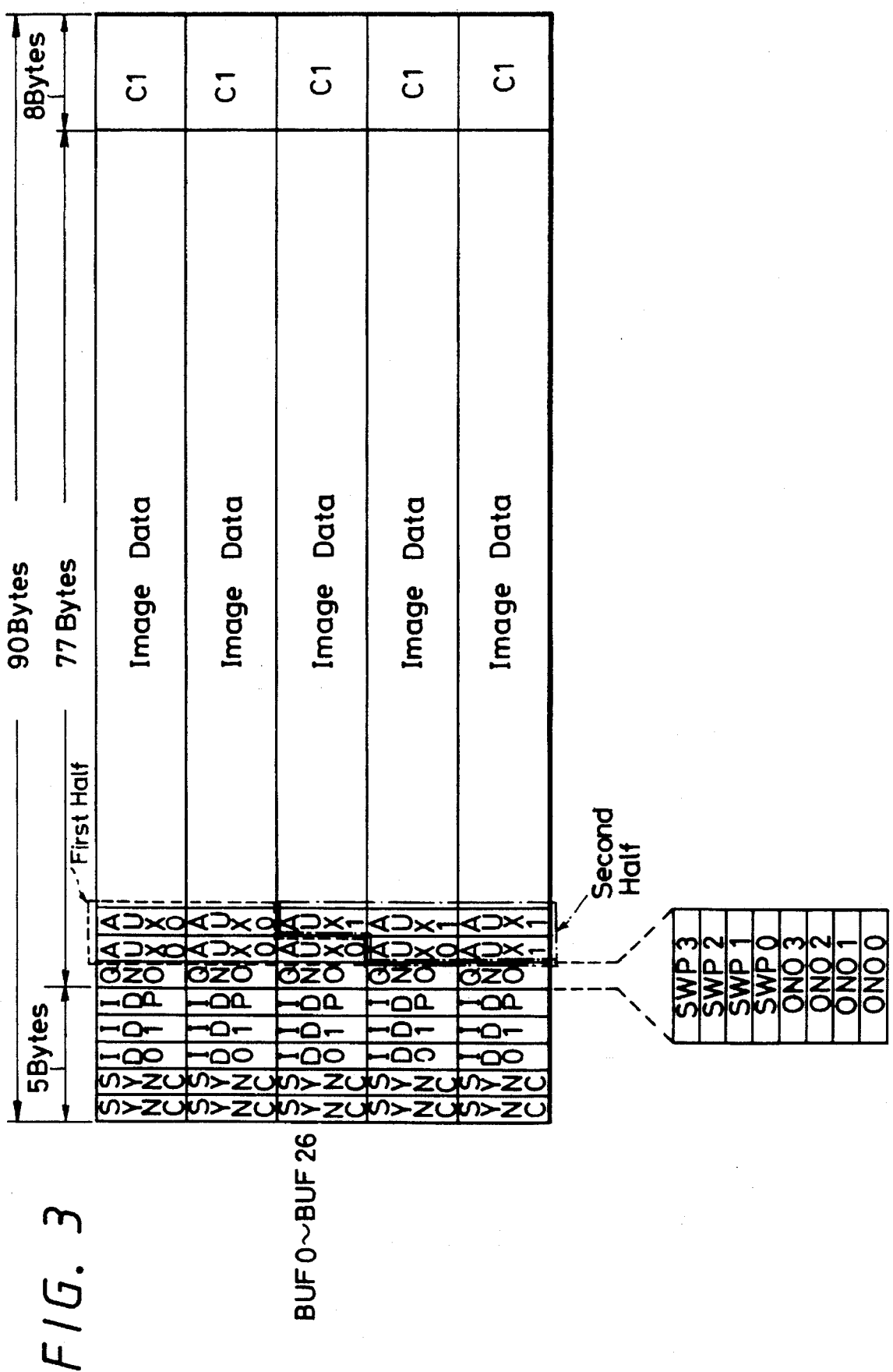
FIG. 3 illustrates the arrangement of sync blocks within one of the buffering units shown in FIG. 2.

FIG. 3 illustrates the contents of one buffering unit which includes, as noted above, 5 sync blocks. Each sync block is formed of, for example, 90 bytes. As shown in FIG. 3, each sync block begins with the same 16 bit sync pattern and a 3 byte ID portion. The ID portion includes 2 bytes (ID0, ID1) of ID data and an ID parity (IDP) byte. The video data portion of each sync block begins with a quantization data byte QNO, which includes in its four low-order bits a quantization number for accessing an image compression quantization data table and also includes switching point information SWP in the four high-order bits. Because the QNO information is so important for the purpose of recovering the compressed data, the same QNO byte is written in each of the 5 sync blocks of the buffering unit. Following the QNO byte are 2 bytes for storing VAUX data, which in turn are followed by, for example, 74 bytes of video data. The ten VAUX bytes in each buffering unit are divided into five "first half" bytes AUX0 and five "second half" bytes AUX1. The AUX0 bytes are the two VAUX bytes in each of the first two sync blocks of the buffering unit and also the first VAUX byte of the third sync block of the buffering unit. The five remaining VAUX bytes of the buffering unit are the "second half" bytes AUX1.

FIG. 4 illustrates how, in accordance with one embodiment of the invention, the VAUX bytes are used in, respectively, the video data area of a recording track formed by an "A" head and in the video data area of a recording track formed by a "B" head. In order to provide data redundancy, and protect against drop-outs caused by head clogs or so-called "side scratches" (i.e. scratches in the longitudinal direction of the tape, which are substantially transverse of or "sideways" with respect to, the recording tracks), mutually different data recording arrangements are provided in the "A" head tracks and "B" head tracks. It should be noted that in FIG. 4 the VAUX bytes are diagramed sequentially according to buffering unit and sync block number.

Also, with respect to both the "A" head tracks and the "B" head tracks, all of the "first half" bytes AUX0 are used for recording teletext data, as well as the "second half" bytes AUX1 in the last buffering unit (i.e. buffering unit 26).

According to this embodiment of the invention, the first AUX0 byte of each buffering unit (and also the first AUX1 byte of buffering unit 26) is used to record a 50/60 data bit, 3 bits of STYPE data, and 4 bits of APPLI data. The remaining four AUX0 ("first half") bytes of each buffering unit (and also the remaining four "second half" bytes of the buffering unit 26) are used for storing teletext data itself. The 50/60 data bit is used to indicate whether the 50 Hz or 60 Hz format is applicable, with the value "0" representing the 50 Hz format and the value "1" representing the 60 Hz format. The STYPE data indicates the type of image signals to be recorded, including information indicative of a standard type (e.g., NTSC, PAL or the like), width of the picture (such as the aspect ratio of 16:9 versus the standard aspect ration 4:3), high definition ("HIVISION") versus standard definition, etc. The APPLI data includes ID data which indicates the data recording structure within the track.

As shown in FIG. 4, the "second half" AUX1 bytes in each track (except for the second half bytes of the last buffering unit) are divided into a "main area" and an "optional area". In the main area is stored data, such as compression system data, that is necessary to reproduce the video data. Such a main area is required in the recording format of all digital VTRs. Also stored in the main area are required data such as the year, month and date of recording, information identifying the source of the recorded signal, dubbing information, and data representing a closed caption for handicapped viewers which has recently been the subject of a legislative mandate in the U.S. The optional area is used for optional data.

Exactly the same data is written into the respective main areas of the "A" head track and the "B" head track for the sake of redundancy, and it will further be noted that the respective main areas of those two tracks are offset with respect to each other as shown in FIG. 4. The duplication of the data between "A" and "B" tracks provides protection against drop-outs from head clogging, whereas the offsetting of the respective main areas provides protection against "side scratches".

Figures 16, 17:
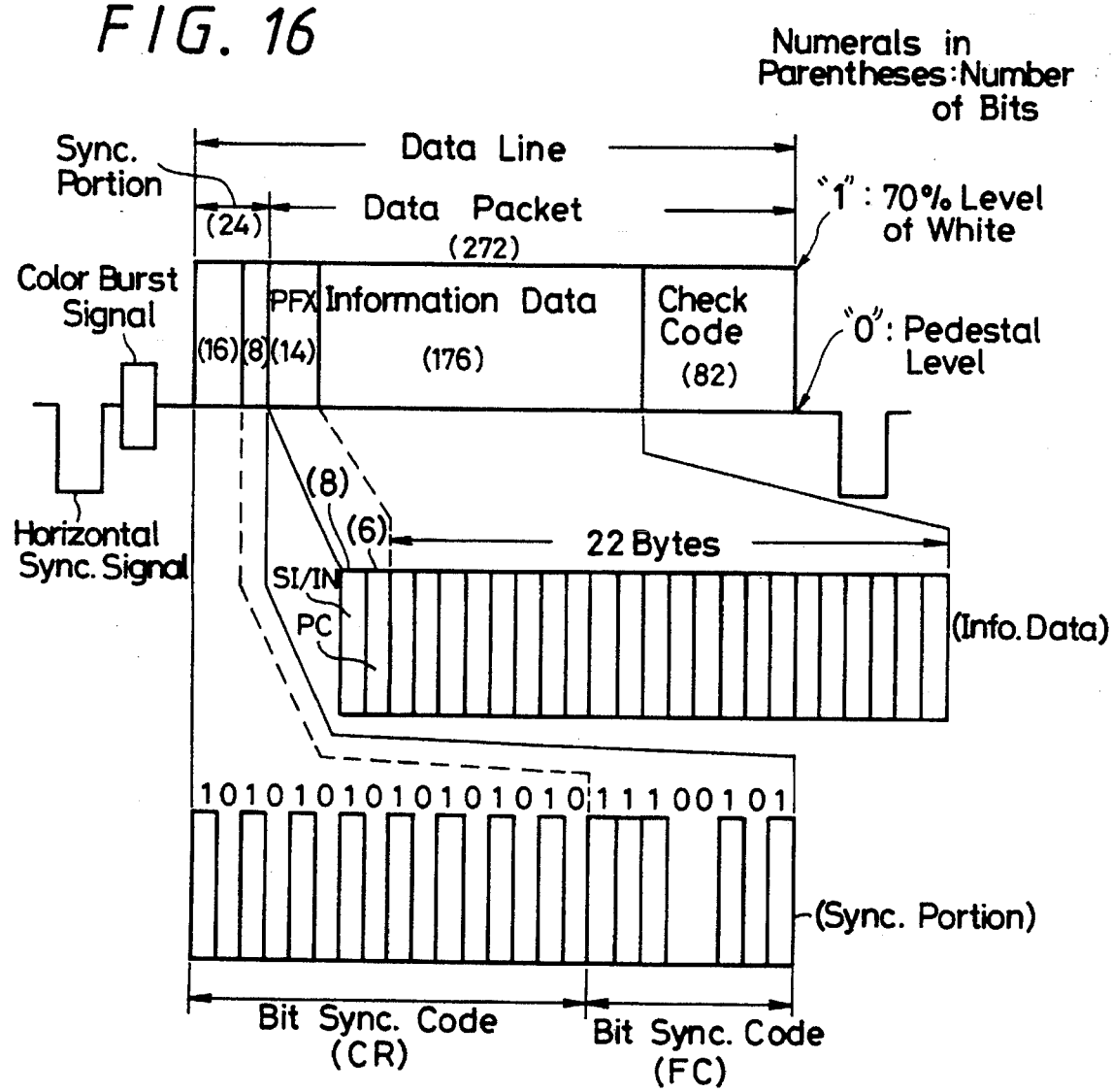
FIG. 16 illustrates a format in which teletext information is broadcast in one horizontal line according to the Japanese teletext broadcasting system.
FIG. 17 is a schematic illustration of a data pack structure used in one embodiment of a teletext information recording apparatus according to the present invention.

According to an alternative embodiment of the invention, the 50/60 - STYPE - APPLI data byte is not included with the teletext data and instead the teletext data is recorded in accordance with a data pack structure as shown in FIG. 17. According to the pack structure of FIG. 17, the 5 data bytes shown therein correspond to the five "first half" bytes of each buffering unit (and the five "second half" bytes of buffering unit 26), with the first of the five bytes being a pack type identification code and the four remaining bytes being used for the teletext data. In the case of a pack used for a teletext data, the type code "01100111" is used, which indicates that the pack is used for teletext data.

Figure 4A:
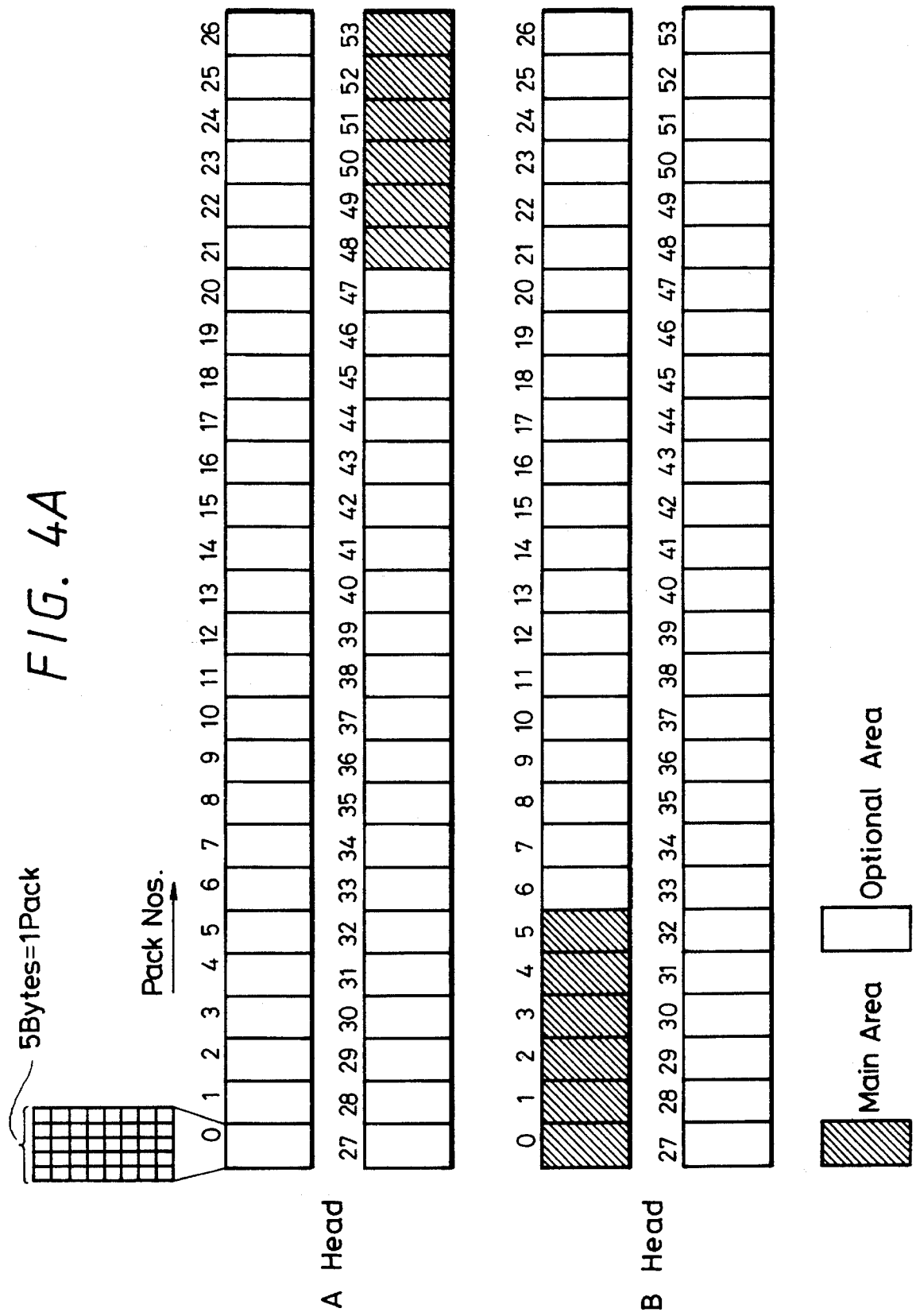
FIG. 4A is an illustration of an alternative format in which teletext data are stored in auxiliary data areas of the buffering units and sync blocks of two recording tracks.

In accordance with this alternative embodiment, a track format is employed as illustrated in FIG. 4A. As shown in FIG. 4A, each track includes an optional area for recording 48 packs of data and a main area corresponding to 6 packs. The pack numbers shown in FIG. 4A may be such that packs 0 and 1 correspond to the 10 VAUX bytes of buffering unit 0, packs 2 and 3 may correspond to the 10 VAUX bytes of buffering unit 1, and so forth. Alternatively, packs 0 and 27 may correspond to the 10 VAUX bytes of buffering unit 0, packs 1 and 24 may correspond to the 10 VAUX bytes of buffering unit 1, and so forth.

All of the 48 packs in the optional area may be used for storing teletext data, or some of the packs in the optional area can be used for other types of data. In the latter case, of course, the data packs which do not contain teletext data will have a type code other than "01100111".

The main areas shown in FIG. 4A are used for the same purposes as the main areas discussed above with respect to FIG. 4. As was the case with the format of FIG. 4, in the format of FIG. 4A the same data is written into the respective main areas of "A" and "B" head tracks to provide redundancy, and the respective main areas of the two tracks are offset to protect against side scratches.

There will now be described recording of broadcast teletext information in accordance with the present invention.

Referring again to FIG. 16 and Table 1, it will be noted that each line of teletext data begins with 16 bits of bit synchronizing code, which are simply a repeating pattern of alternate 1's and 0's, and which can be reproduced later if the clock frequency thereof is known. Accordingly, there is no need to record the bit synchronizing code and the other data in the line can be extracted and recorded.

As a result, the number of bits per line to be recorded are as indicated below:

| | |
|---|---|
| Japan | 280 bits (35 bytes) |
| U.S. | 272 bits (34 bytes) |
| U.K. | 344 bits (43 bytes) |
| France | 304 bits (38 bytes) |

A manner of recording the teletext data on a magnetic tape will now be described. In each frame the teletext data is typically transmitted in two bursts, i.e. once in the first field and once in the second field of the frame. In order to write the teletext data in the VAUX data areas as described with respect to FIGS. 2–4, it is necessary to match the timing of the teletext data with the timing of the compressed image signal data. In particular, the teletext data for each frame are stored in a memory, such as a first-in first-out (FIFO) memory or the like, and the necessary quantity of data is read out in response to a write timing signal.

Figure 5:
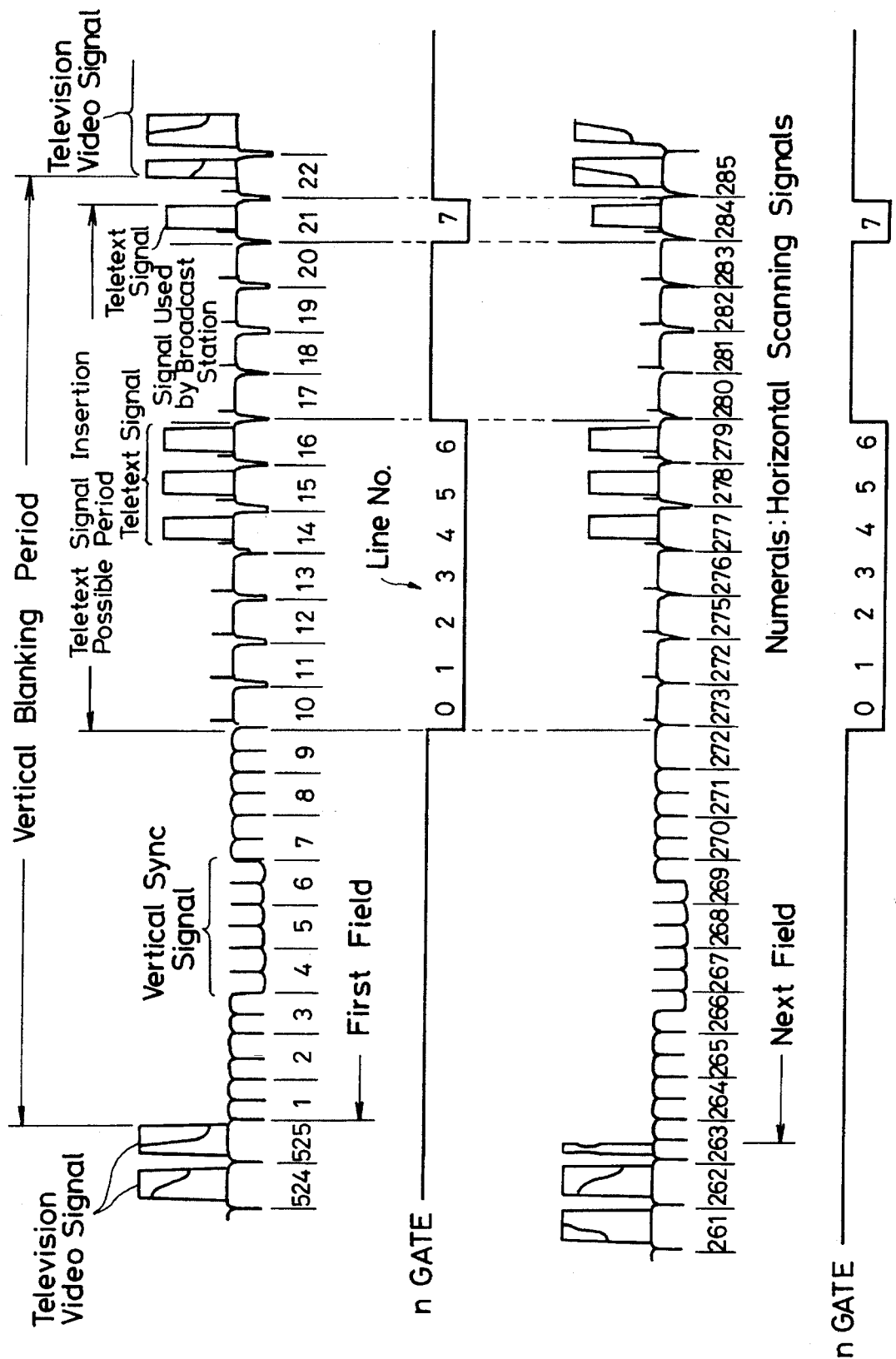
FIG. 5 is a waveform diagram that illustrates insertion of teletext signals within horizontal lines of a vertical blanking period of a broadcast television signal in accordance with the Japanese teletext broadcasting format.

It is to be noted that not all television broadcasting stations insert the teletext information in the same lines of the frame, but rather, among the lines set aside according to the standard for teletext broadcasting, the lines actually used vary from station to station. Accordingly, tape recording of the broadcast teletext information requires an indication of the actual positions of the information within the broadcast signal. FIG. 5 shows the horizontal lines in the vertical blanking period within which teletext signals may be inserted in accordance with the Japanese teletext system. In addition, a gate signal gate is shown, which is used for indicating the time intervals during which the teletext signal may be present. This gate signal nGATE is the same as a gate signal that is presently used in conventional teletext broadcasting reception devices. By using this gate signal, the line numbers during the period of time when the gate signal GATE equals "0" can be numbered from 0 to 7.

A circuit for performing recording processing on a broadcast teletext signal will now be described with reference to FIG. 6A. For the sake of simplicity, only circuitry for recording processing teletext information in accordance with the Japanese standard format will be described, but it should be understood that very similar circuit arrangements, except for operating frequencies, may be provided for the other standard teletext broadcasting formats.

As shown in FIG. 6A-I, a composite video signal is received at an input terminal 1 and supplied to a synchronizing signal separating circuit 2. The synchronizing signal separating circuit 2 extracts a horizontal synchronizing signal HSYNC from the composite video signal and also provides a field identification signal ODD/EVEN. The field identification signal is provided to a counter clear pulse generating circuit 3, which, in response to leading and trailing edges of the field identification signal ODD/EVEN supplies clear signals to a horizontal line counter 4 and a line number generating circuit 6.

The horizontal line counter 4 and the line number generating circuit 6 also receive the horizontal sync signal HSYNC output from the synchronizing signal separating circuit 2. The horizontal line counter 4 counts the HSYNC signal, and outputs a corresponding count value to a decoder circuit 5, which decodes the count output to form the GATE signal discussed above with respect to FIG. 5. The GATE signal is provided to the line number generating circuit 6, which is thereby enabled to form the line numbers 0–7 for identifying the lines in which teletext information may be present.

The input composite video signal is also supplied from the input terminal 1 to a pedestal level clamping circuit 7, at which an appropriate pedestal DC level is established, and the resulting signal is then supplied to a comparator 8. A comparison voltage which has been set to an appropriate intermediate level between 70% of the white level and the pedestal level, 0.5 volts for example, is also supplied to the comparator 8, which thus serves to detect the "0" or "1" values of the bits making up the teletext information included in the input video signal. The output signal from the comparator 8 is a digital signal at a so called TTL level, and the same is provided as an input to the serial-to-parallel (S/P) conversion circuit 9. The S/P conversion circuit 9 converts the bit-serial data stream output from the comparator 8 into a parallel signal, so that the data is converted from a bit stream to a sequence of data bytes.

A serial clock signal SCK, supplied to the S/P conversion circuit 9, is generated in following manner: Initially, a color burst signal included in the input composite video signal is extracted by a burst ACC circuit 11. The color burst signal is then provided as a reference signal to a phase locked loop (PLL) circuit 12 which operates at the color subcarrier frequency fsc =3.58 Mhz. The 3.58 Mhz signal output from the PLL circuit 12 is provided to a ⅕ frequency dividing circuit 13 and the resulting frequency-divided signal is, in turn, provided as a reference signal to a second PLL circuit, which operates at a frequency of ¹⁶⁄₅×fsc. The ¹⁶⁄₅ fsc signal output from the PLL circuit 14 is then supplied to a ½ frequency divider 15 which outputs the desired serial clock signal SCK having a frequency of 5.727272 Mhz and a duty cycle of 50%. The clock signal SCK is provided to a ⅛ frequency divider 16 in addition to the S/P conversion circuit 9.

Data bytes output from the S/P conversion circuit 9 are latched into 8-bit D-type flip-flop (DF/F) 10 in response to a latching signal LCK provided by the frequency divider 16. The data bytes are provided, in turn, from the DF/F 10 to a clock run-in (CRI) detection circuit 18. The CRI detection circuit 18 also receives the GATE signal as well as a signal that is output from a monostable multivibrator 17 which is triggered by the HSYNC signal. The output from the monostable multivibrator circuit 17 provides a signal that is active over a period that corresponds to the ninth to sixteenth CRI pulses based upon the HSYNC signal. If the GATE is at a "low" level during this period, and if the output of the DF/F 10 is 00h, then no CRI signal is present, and it can accordingly be determined that there is no teletext information on the current horizontal line. On the other hand, at such a time, if the signal output by the DF/F 10 is AAh (10101010), then it is determined that teletext information is present in the current horizontal line so that the CRI detection circuit 18 outputs the signal nEXIST at an active or "low" level. The NEXIST signal output from the CRI detection circuit 18, and also the GATE signal and the byte latching signal LCK, are supplied to a timing controller 22, which controls the state of a switch 19.

Figures 7, 8:
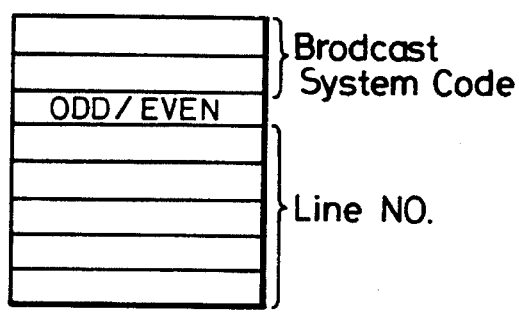
FIG. 7 illustrates the format of a line ID byte to be recorded with teletext data in accordance with the present invention.
FIG. 8 schematically illustrates a manner of distributing, in accordance with the present invention, lines of teletext information, broadcast in accordance with the Japanese teletext broadcasting standard, among ten tracks used for recording one frame of a broadcast television signal.

The line number data output from line number generating circuit 6, the ODD/EVEN signal output from the synchronizing signal separating circuit 2, and a broadcasting system identification code, are supplied in parallel to one fixed contact of the switch 19 to provide a line number identification byte having the form shown in FIG. 7.

The two highest order bits are used to represent the format i.d., as follows:

| | |
|---|---|
| JAPAN | 00 |
| NABTS | 01 |
| FRANCE | 10 |
| U.K. | 11 |

The next bit is a field identifier (odd or even) and the last five bits are a line number code which is sufficient to identify up to 32 lines which may be used in an expanded teletext broadcast system. The broadcasting system identification code represents the broadcasting system under which the VTR is intended to be used, and is supplied from a mode control microcomputer (not shown) which controls operations of the digital VTR.

The other fixed contact of the switch 19 is provided with the data bytes output from the DF/F 10. Thus, at a timing controlled by the timing controller 22, the switch 19 selectively provides to a DF/F 20 either the line number identification byte or teletext data bytes. The data bytes latched into the DF/F 20 are, in turn, stored in FIFO memory 21. Switch 19 is operated so that the line number identification byte is the first of 35 bytes of information stored in the FIFO memory 21 for each horizontal line of the input video signal in which the teletext information is present. Accordingly, the line number identification byte replaces the byte sync code (framing code) present in the broadcast teletext signal (see FIG. 16).

Although all of the teletext data for a frame of the video signal is written into the FIFO memory 21 by the end of the vertical blanking period for the second field of the frame, it will be appreciated that not all of the video data for the frame is available at that time, particularly in view of the need to compress the video data. Accordingly, reading out of the teletext data from the FIFO memory 21 begins at the time that the next frame of the video signal is received. It will also be appreciated that the teletext data is to be read out so that it is recorded interspersed with the video data in accordance with the arrangement shown in FIG. 4. Insertion of the teletext data into video auxiliary data areas is carried out by a framing circuit (not shown) and if the pack structure shown in FIG. 17 is used, a packing circuit (inset in FIG. 6A-II) including a switch 23 is interposed between the FIFO memory 21 and the framing circuit. In that case, the switch 23 is controlled on the basis of signals from the timing controller 22 and the framing circuit.

The framing circuit forms the video and teletext data into sync blocks (as in FIG. 3), which are recorded in the video areas of each track (FIG. 2).

The timing controller 22 also provides a read clock signal to FIFO memory 21.

A circuit for performing reproduction processing with respect to teletext data that has been tape recorded in the manner described above will now be described with reference to FIG. 6B.

Initially, reproduced teletext data is extracted from the signal reproduced from the tape at a deframing circuit (not shown) and stored in a FIFO memory 101. If the pack structure referred to with respect to FIG. 17 had been used in recording the teletext data, then an unpacking circuit (see the inset on FIG. 6B-I) is interposed between the deframing circuit and the FIFO memory 101, and includes a suitably controlled switch 124 which discards the pack type code byte. It will be appreciated that the deframing circuit reverses the framing processing performed by the aforementioned framing circuit.

A framing control clock signal PBCK is provided as a write clock signal to the FIFO memory 101. Although the storage of the reproduced teletext data in the FIFO memory 101 is completed at the end of one frame period (e.g., the period required to scan 10 recording tracks), data at the starting portion of the frame of teletext data is latched into DF/F 103. The data stored in the DF/F 103 includes the broadcasting system identifying code, which is in turn supplied to and latched in a timing controller 102, which provides a read clock signal to the FIFO memory 101. The timing controller 102 is also supplied with an identification code which indicates the broadcasting system for which the VTR is intended to be used (this code is supplied, as before, from the mode control microcomputer for the VTR, for instance). The identification code supplied from the mode control microcomputer and the broadcasting system identification code received from the DF/F 103 are compared at the timing controller 102 to determine whether the reproduced teletext data is of the type that the VTR is equipped to reproduce. If not, the stored and latched teletext data are discarded, and the reproduction operation which is to be described below is aborted. On the other hand, if it is determined that the VTR is of the type which is able to reproduce the recorded teletext data, then the ODD/EVEN signal and the line number signal latched in the DF/F 103 are provided to a decoder 104, which converts the line number data into the original line number for indicating the position of the line of data within a video frame.

As is known to those skilled in the art, in order to achieve data compression efficiency, digital VTRs do not record the HSYNC and the VSYNC synchronizing signals which are part of the video signals that are to be recorded. Therefore, during reproduction processing of the recorded video data, it is necessary to generate new HSYNC and VSYNC synchronization signals, which are combined with reproduced and processed video data to provide an output composite video signal.

Accordingly, an fsc oscillator 107 outputs a stable clock signal fsc based on, for example, a crystal oscillator, and various required clock signals are generated on the basis of the master clock signal output from the oscillator 107. Thus, by means of a 16/5 frequency multiplier 108 and a ½ frequency divider 109, a serial clock signal SCK is generated with a frequency of 5.727272 Mhz and a duty cycle of 50%. In addition, the serial clock signal SCK is processed at a 1/8 frequency divider 110 to generate a byte clock signal LCK. Further, a synchronizing signal generating circuit 111 is supplied with the master clock fsc and derives therefrom a horizontal synchronizing signal HSYNC and a vertical synchronizing signal VSYNC. The horizontal synchronizing signal HSYNC is provided as a clock signal to a horizontal line counter 113, which receives a clear signal from counter clear pulse generating circuit 112 in response to the vertical synchronizing signal VSYNC provided thereto from the synchronizing signal generating circuit 111. A line number count signal HNO. output from the counter 113 is supplied to a comparator 105. The comparator 105 constantly compares the output of the counter 113 with the horizontal line number data output from the decoder 104, and when a coincidence occurs between the two input signals, the comparator 104 outputs a signal indicative of the coincidence to the timing controller 102. In response to that signal, the timing controller 102 causes the next data byte to be latched in a DF/F 106 from the FIFO memory 101.

A three-input/one-output switch 125 has one fixed terminal thereof supplied with the teletext data latched in and output from the DF/F 106. Another fixed terminal of the switch 125 receives a previously generated clock run-in signal (alternating ones and zeros), and a third fixed terminal of the switch 125 receives a previously generated framing code byte. Under the control of timing controller 102, switch 125 is operated so that, at the beginning of each line of reproduced teletext data, first the clock run-in signal is output, and next the framing code, followed by a sequence of data bytes representing the reproduced teletext data itself, and the resulting sequence of bytes are provided to a DF/F 115. The bytes of data output from the DF/F 115 are converted to a serial data bit stream at a parallel-to-serial (P/S) conversion circuit 116 on the basis of the serial clock signal SCK provided thereto.

For the final composite video signal that is to be output, it is necessary to convert the digital signal levels to an analog signal at 2Vpp. For this purpose, the serial data stream output from P/S conversion circuit 116, and the HSYNC signal, which are both at the TTL level, are provided to respective TTL/analog level conversion circuits 117 and 120. Processed and decompressed reproduced video data is provided to a digital-to-analog converter 126 and the analog video signal output from the D/A converter 126 is provided to a level conversion circuit 118 for adjustment to a predetermined level. The level-adjusted analog video signal is provided from the level conversion circuit 118 to one fixed contact of an analog switch 127, which receives at its other fixed contact the level-converted teletext data output from conversion circuit 117. The position of the analog switch 127 is determined on the basis of the output signal from comparator 105, so that the analog video signal is output from the switch 127 except for the lines in which the reproduced teletext signal is to be inserted, at which lines the switch 127 outputs the reproduced teletext signal. The resulting output signal from the switch 127 is provided to one fixed contact of a three-input/one-output switch 121. A second fixed terminal of the switch 121 receives the clock signal fsc provided from the oscillator 107 through a level conversion circuit 119. The third fixed contact of the switch 121 receives the level converted horizontal synchronizing signal HSYNC provided from H period timing generating circuit 114 through a level conversion circuit 120. The position of the switch 121 is controlled on the basis of the signal generated by a horizontal period timing generation circuit 114 on the basis of the master clock signal fsc.

It is to be understood that the switch 121 includes circuitry for adjusting the pedestal level of the signal to be output therefrom and for mixing the adjusted pedestal level with the teletext data to be included therein. The output from the switch 121 is adjusted to a 2Vpp signal by an amplifier 122 and then output at an output terminal 23 as a composite video signal having the reproduced teletext information inserted in selected horizontal lines thereof.

Circuitry for handling the North American, U.K. and French teletext systems can be realized in essentially the same manner as the above-described circuitry for the Japanese system.

Recording of the lines of teletext data among the recording tracks used in recording a frame of the broadcast video signal, in accordance with one embodiment of the invention, will now be described with reference to FIG. 8. As noted above, 35 data bytes are included in each line of the broadcast teletext data, whereas in the format shown in FIG. 4 there are 112 byte storage locations provided in each track for recording teletext data (4×27 first half VAUX bytes plus the last four second half VAUX bytes of the last buffering unit). As indicated in FIG. 8, three and one-fifth lines of the teletext data are recorded in each track so that for the ten tracks required to record one frame in a 60 Hz video format (as in Japan) there is a capacity for recording a total of 32 lines of teletext data. Since currently only eight lines of the broadcast signal are used for teletext information, each line of teletext information in the frame can be written four times among the recording tracks to be used for the video frame. In a preferred embodiment of the invention, the lines of teletext data are recorded sequentially in order (lines 0–7) and then repeated three more times. In this way, the exposure of the teletext data to corruption by error can be reduced, because errors that occur in one portion of one or more of the tracks can be corrected by using the data written in other portions of other tracks.

Even if the maximum number of lines, i.e., 16 lines per frame, are used for broadcasting the teletext information, the above format still permits each line of teletext data to be recorded twice.

It will also be noted that since the number of bytes of recording capacity per track is not an integral multiple of the 35 bytes of teletext data per broadcast line, the lines are shifted longitudinally from track to track. As will be shown, this longitudinal shifting also provides protection against data corruption.

Figure 9:
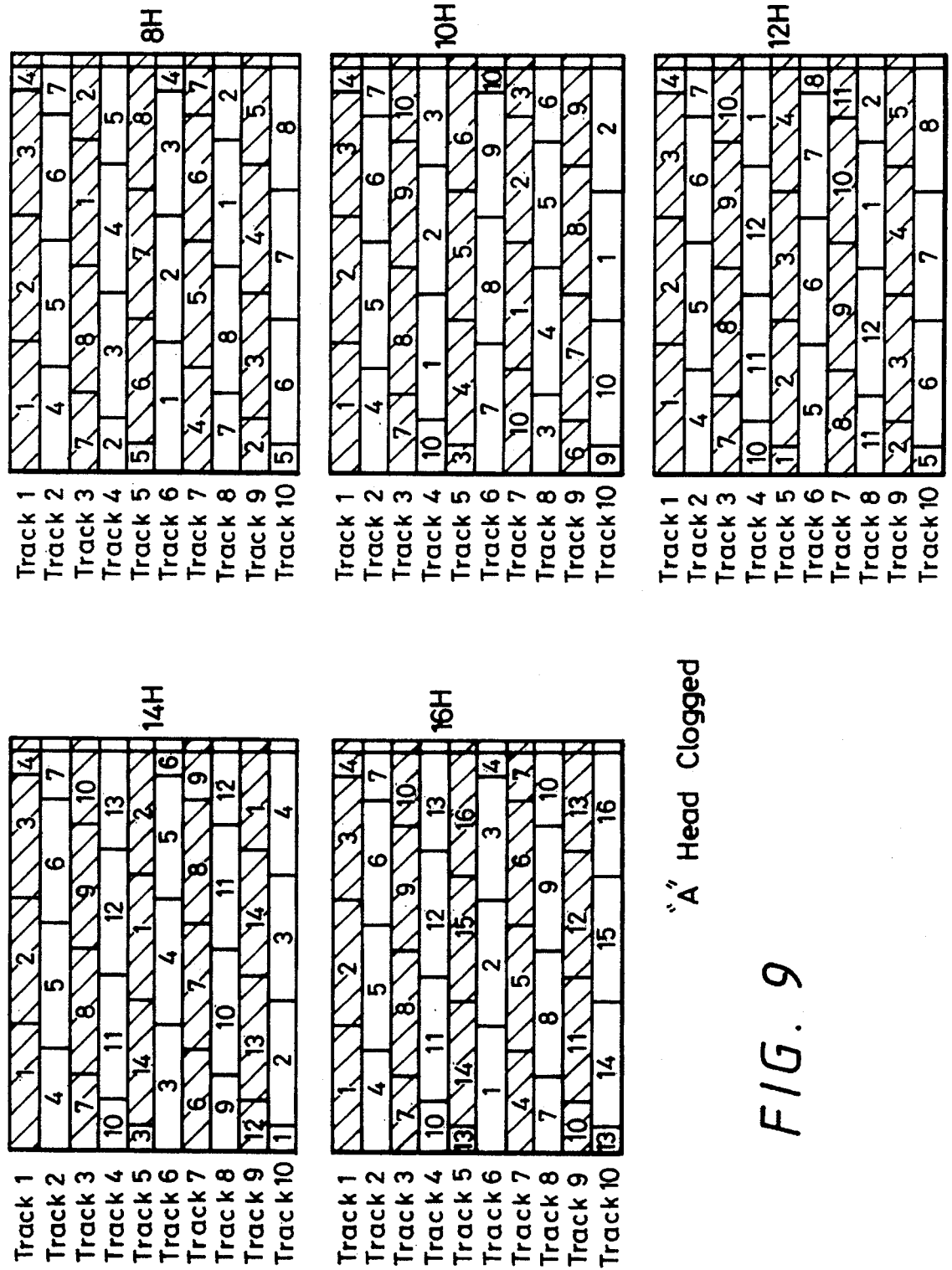
FIG. 9 schematically illustrates the effect, with respect to lines of teletext information recorded as shown in FIG. 8, of a drop-out caused by clogging of an "A" recording head.

The beneficial effects of the recording format shown in FIG. 8 will now be described with reference to FIGS. 9–11. In FIG. 9, the respective portions thereof labelled "8H", "10H", "12H", "14H", and "16H", respectively indicate recording formats to be used when recording teletext broadcast data provided in 8, 10, 12, 14, or the maximum of 16 lines per frame. The numerals within each of the portions of FIG. 9 are indicative of the nth line number of teletext data within the respective broadcast frame. In FIG. 9 each of the odd-numbered tracks are shaded, to indicate corruption of the data contained therein due to clogging of the "A" head.

Figure 10:
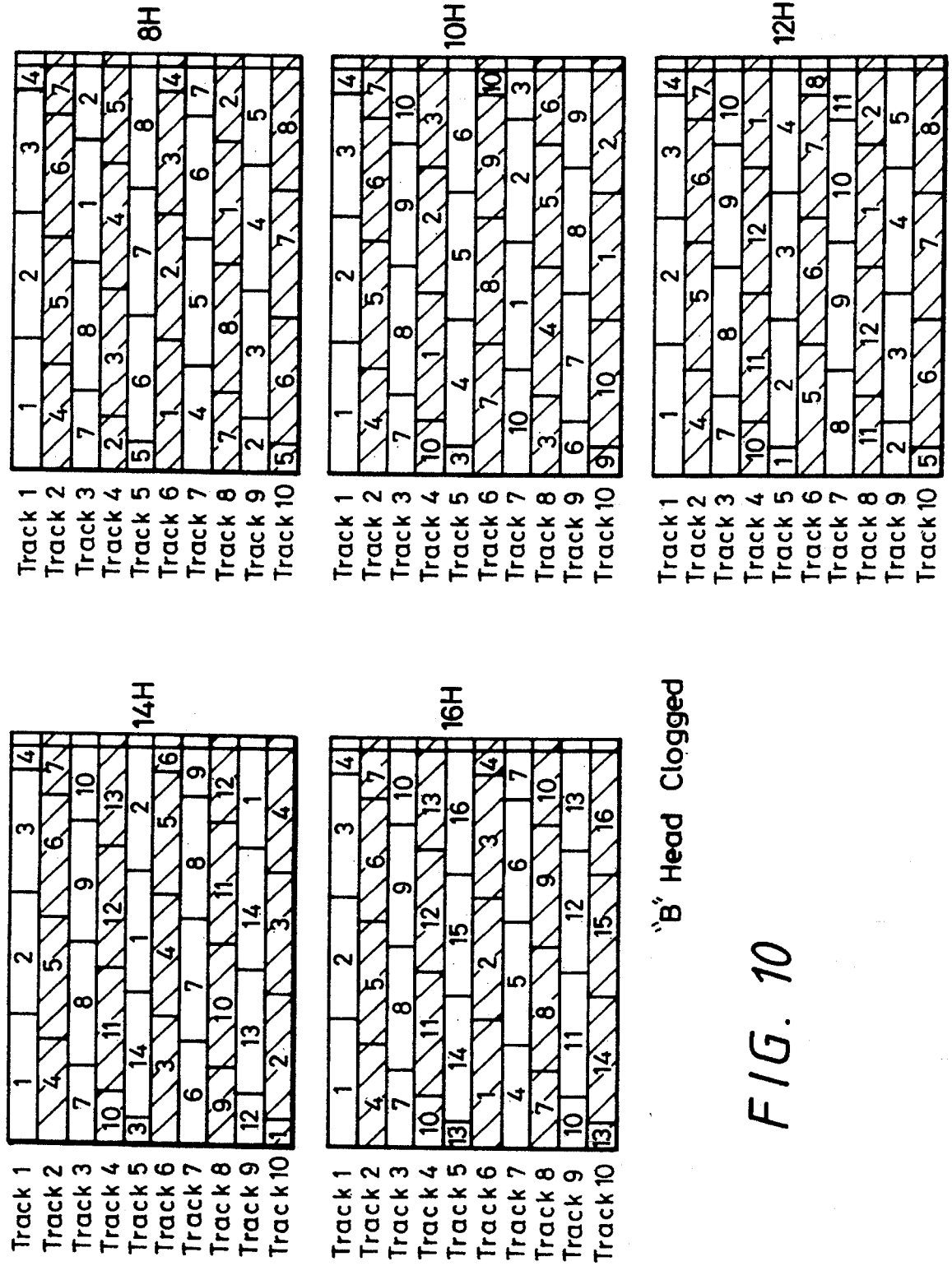
FIG. 10 schematically illustrates the effect, with respect to lines of teletext information recorded as shown in FIG. 8, of a drop-out caused by clogging of a "B" recording head.

FIG. 10 is the same as FIG. 9, except that the even-numbered tracks, rather than the odd-numbered tracks, are shaded to indicate corruption of data due to clogging of the "B" head.

With the arrangement shown in FIGS. 9 and 10, the teletext data can still be recovered, in most cases, even if one of the heads is clogged. Also, during recording, as noted above, the lines of teletext data are simply read out in sequence, and then the same sequence is repeated, which enables use of a simple first-in first-out memory for buffering of the data, with the FIFO memory being reset by a reset pulse, and the read-out cycle continuing until the teletext data storage capacity for the frame is exhausted. This is a simpler circuit arrangement than would be required if the order of recording the lines of teletext data were to be changed from one sequence to the next.

The relatively few cases in which data cannot be recovered in the event of a head clog occur with respect to certain lines when 12 or 14 lines of the broadcast frames are used for teletext data. The unrecoverable lines in these cases are indicated in the following Table 2.

TABLE 2

|  | 12 lines | 14 lines |
| --- | --- | --- |
| "A" head clog | 2, 3, 4, 9, 10 | 1, 7, 8, 9, 14 |
| "B" head clog | 5, 6, 7, 11, 12 | 4, 5, 6, 10, 11, 12 |

Referring now to FIG. 11, the shaded portions therein are representative of the effect of 3 "side scratches" extending in parallel in the longitudinal direction of the tape, i.e., transversely of the recording tracks. It will be understood that it would be very unusual for there to be three parallel side scratches as shown in FIG. 11. In any event, only in the case of the utilization of the maximum number of lines (16) are there some lines which cannot be read out because of the side scratches.

Accordingly, Table 3, which is provided below, summarizes the outcome of the three examples shown in FIGS. 9–11, with "OK" indicating that all lines can be reproduced, and "NG" indicating that some lines cannot be reproduced.

TABLE 3

|  | "A" head clog | "B" head clog | side scratch |
| --- | --- | --- | --- |
| 8 lines (present) | OK | OK | OK |
| 10 lines | OK | OK | OK |
| 12 lines | NG | NG | OK |
| 14 lines | NG | NG | OK |
| 16 lines (maximum) | OK | OK | NG |

It should be understood that in actual practice, when there is a side scratch, or a head clog of significant duration, usually the video and audio data are fatally corrupted, so that there is little point in attempting to provide fool-proof protection for recorded teletext data. Furthermore, it is to be expected that head clogs and side scratches will not commonly be experienced in home-use digital video tape recorders.

The outcomes illustrated in Table 3, above, were provided without taking into account the error correction capability that is provided within the broadcast teletext data itself. Nevertheless, it is within the contemplation of the present invention that the error correction capability provided in the broadcast teletext data be made use of. For example, the Japanese teletext broadcast format uses a (272, 190) reduced difference set cyclic code that can be decoded by a majority logic circuit. Thus such a majority logic circuit can be incorporated in the digital VTR proposed by this invention.

Since the recorded teletext data includes the same powerful error correction product code as the video data shown in FIG. 2, it can be expected that most or all of the adverse outcomes indicated by "NG" in Table 3 could be prevented by using the error correction code.

Figure 12:
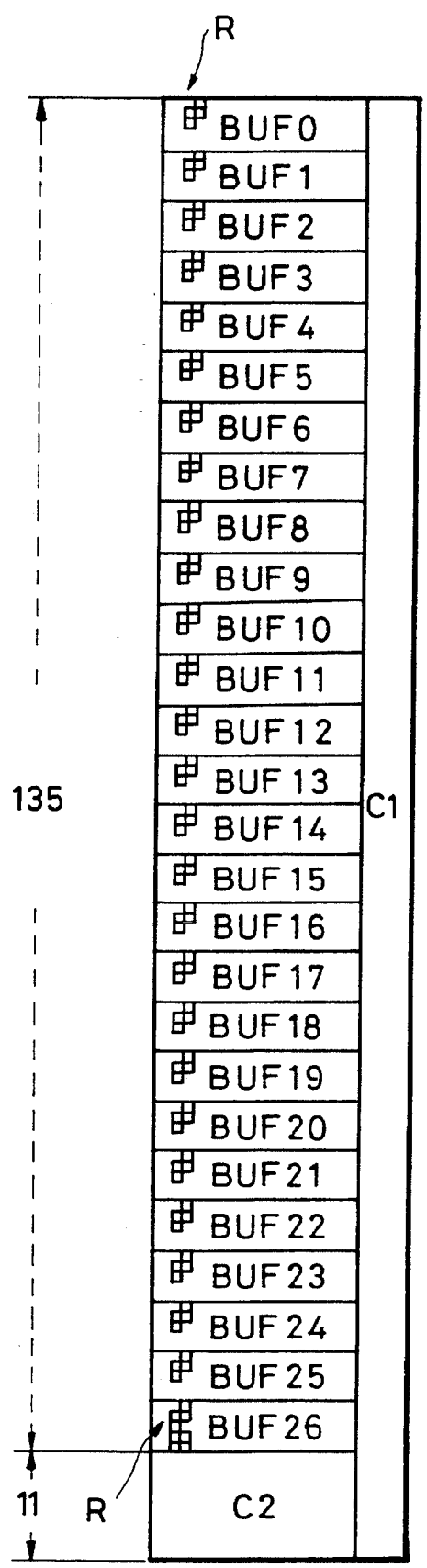
FIG. 12 is an illustration, similar to FIG. 2, of buffering units within the video area of a recording track, but also showing locations at which teletext information is recorded interspersed with image data.

Although FIGS. 8–11 illustrate the distribution of lines of recorded teletext data among recording tracks in a schematic fashion, a more realistic illustration of the teletext recording locations, dispersed among the recorded video data, is provided in FIG. 12. In particular, in FIG. 12 the small rectangles R within each of the buffering units are indicative of the locations in which the teletext data is recorded interspersed with the video data. It will accordingly be appreciated that the resistance of the teletext data to corruption from side scratches is much more robust then might be thought from the example illustrated in FIG. 11.

When a head clog occurs, reproduction of both the picture and the sound is prevented, which generally means that the magnetic head is cleaned to eliminate the head clog. On the other hand, if a head is clogged for only a short period of time, then the data, including the teletext data, can be protected by the error correction product code. Thus, comparing the seriousness of head clogs with that of side scratches, it will be recognized that side scratches are a much more significant problem because side scratches cannot be removed from the tape. It is known from experience that a typical width for a side scratch is about three sync blocks, and such a width is indicated in the example shown in FIG. 11. In this case, the corrupted data can be almost completely reconstructed by using the C1, C2 error correction product code. Thus the teletext data recording format proposed herein results in a simple circuit design, while providing robust resistance to errors.

There will now be described, with reference to FIGS. 8A–8C, an alternative manner of distributing a frame of teletext data among recording tracks. This alternative format corresponds to the track format described above with respect to FIGS. 17 and 4A, and it will be assumed with respect to the format shown in FIG. 8A that all 48 packs of the optional areas of FIG. 4A are used for recording teletext data. It will further be assumed that the current Japanese teletext broadcasting format is used, including eight lines of teletext data per frame, and 35 bytes of teletext data per line.

Figure 8B:
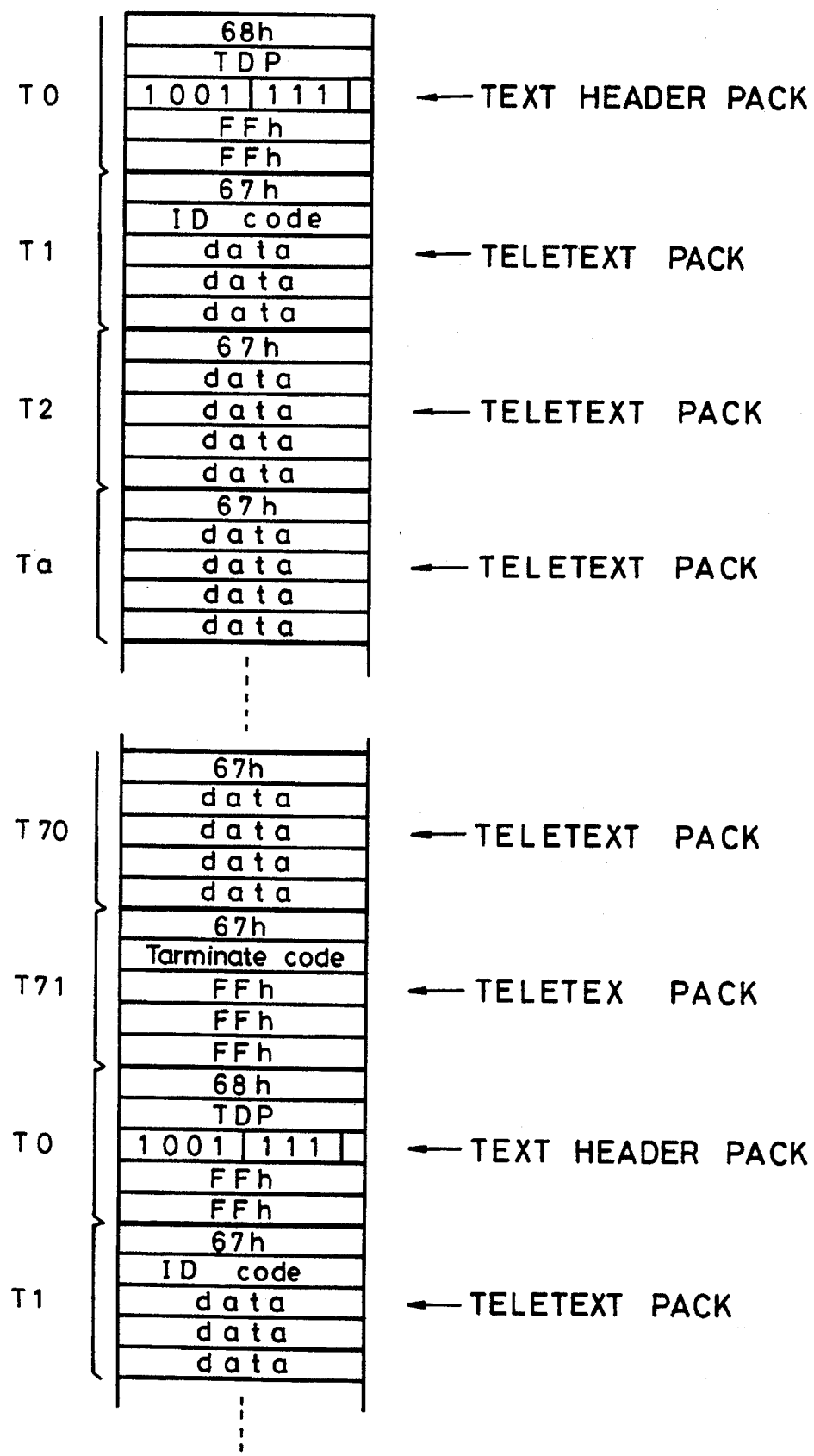

As indicated by FIG. 8B, 72 packs are required for recording the teletext data included in each frame of the broadcast video signal. The first of the 72 packs is labeled T0, and is referred to as a "text header pack". The text header pack TO is followed by 70 teletext packs, T1–T70, in which the teletext data itself is stored (8 lines×35 bytes/line=380 bytes/frame=70 packs×4 bytes/pack). The last pack is labeled T71 and contains a one-byte terminal code and three filler bytes.

Referring again to FIG. 8A, it will be seen that the 72 packs which contain the frame of teletext data are recorded twice in sequence in the first three tracks used for the video frame, then twice more in the next three (fourth through sixth) tracks, and twice more in the seventh through ninth tracks. Thus, the teletext data is recorded six times in all. The tenth track has filler or "no information" bytes recorded therein.

FIGS. 8B and 8C show details of the formats of the packs used for recording teletext data.

The first byte of the text header pack TO is the type code byte and has the value 68h (01101000), which is indicative of a text header pack. The second byte of pack TO is data TDP indicative of the number of teletext packs to follow the text header pack T0. In the example illustrated herein, TDP=71. The four most significant bits of the third byte are a text type code that identifies the kind of text data contained in the following packs; in this case the text type code has the value 9 (1001), which is indicative of teletext. The balance of the pack T0 may be filled with 1's.

The packs T1–T70, which contain the teletext data itself, are in the format discussed previously with respect to FIG. 17 and so need not be described further.

Pack T71 begins with the same type code byte as the preceding packs T1–T70, but the second byte of the pack T71 is a terminate code which indicates that the frame of teletext data is complete. This terminate code is useful, for instance, when other types of data in addition to teletext data are stored in the optional areas. Respective terminate codes to be used with the various teletext broadcasting formats are listed in FIG. 8C. The last three bytes of the pack T71 are simply filled with 11's.

The "no information" packs used to fill the tenth track are simply filled with 1's, including the type code.

To summarize the foregoing:

1. According to the present invention, teletext broadcast data are recorded without decoding, so that the inherent error correction capability of the broadcast teletext data can be used effectively.
2. The error correction capability that is provided for protecting video data in a digital VTR can be effectively used with respect to the teletext data by recording the teletext data in the VAUX areas within the video data recording area.
3. The teletext recording format proposed in the present invention provides robust resistance to data errors caused by side scratches and short-term head clogs by recording the teletext data in the AUX areas of the video data recording area.
4. Data restoration based on "majority-decision" processing of multiplex-recorded teletext data can be used by repeatedly storing the teletext data within the full storage capacity accorded to each frame.
5. By selecting the teletext data storage capacity of each recording track to be other than an integral multiple of the data capacity of each line of the broadcast signal, an interleave effect can be achieved which permits restoration of data based upon "majority-decision" processing.

There will next be considered an approach for recording teletext that is broadcast according to the U.K. and German format, it being understood that essentially the same format is used in both countries.

In these two countries, a VPS signal, a test signal and so forth are inserted into 32 arbitrarily selected lines among lines 7–22 and 320–350 of each frame. Accordingly, it is not possible that all of these lines can be effectively used for telecast broadcasting. The maximum number of lines that can be used in the future for teletext broadcasting is 28, so that it is sufficient to prepare a teletext recording system which corresponds to a maximum number of 28 lines of teletext information per frame.

FIG. 13 illustrates a manner of distributing lines of teletext data among the 12 tracks used to record a frame of a broadcast video signal according to standards used in the U.K. and Germany. In essence, the approach to distributing the lines of teletext data is the same as was shown in FIG. 8. As indicated in FIG. 13, the 12 tracks contain sufficient capacity to record 31 sets of 43 bytes plus a remaining 11 bytes. Accordingly, the 12 tracks used for recording one frame of a video signal have the capacity to record an additional three lines or more beyond the 28 lines which are the maximum number of lines of teletext data per frame. The extra three lines can be filled, for example, by simply reading teletext data out again from the beginning of the FIFO memory.

Since the current practice in Germany is to broadcast 15 lines of teletext information per frame, the teletext information can be recorded twice in the allocated areas of the 12 tracks. Illustrative diagrams corresponding to those of FIGS. 9–11 are omitted with respect to recording of the German standard teletext broadcast signal.

An approach for providing one recording method for both of the 60 Hz broadcasting formats and a second recording approach for both of the 50 Hz recording formats will be described next. Reference to Table 1 above indicates that the Japanese and North American teletext broadcasting systems have the same clock frequency and that the number of bytes in a line of teletext data in the North American system is one byte less then the number of bytes per line in the Japanese teletext broadcasting system. Further, the respective teletext broadcasting systems in the U.K. and France have mutually different clock frequencies and the number of bytes per line in the French teletext broadcasting system is five bytes less then the number of bytes per line in the U.K. teletext broadcasting system. However, if it were attempted to record the North American and French teletext data without filler bytes, it would be necessary to provide significantly larger circuitry and more complex hardware. Instead, it is proposed according to the present invention that the respective differences between the Japanese and the U.S. line capacities as well as the differences between the U.K. and French line capacities be made up by dummy bytes (all zeros) as indicated on FIG. 14. In this way, it can be provided that both of the teletext broadcasting systems in the 60 Hz format can be recorded according to the format of FIG. 8, while both of the teletext broadcasting systems in the 50 Hz format can be recorded as shown in FIG. 13. It should also be noted that, in current practice, it appears that the French teletext broadcasting system known as "ANTIOP" is in the process of being changed to conform to the U.K. teletext broadcasting system as a result of standards unification being carried out in the European community.

There are also error-correction advantages that can accrue by the provision of the filler bytes for the North American and French broadcasting systems. In particular, since the areas in which zeros are to be inserted are known in advance, such areas can be, checked during the playback mode before the error correction code processing occurs. Thus the C1 and C2 parity values can be calculated based on other areas, in which errors may have occurred, so that there is a large possibility that those errors in the other areas can be corrected. For example, the areas in which an error occurred may simply be skipped. Thus the error-correction advantages that accrue to the provision of the filler bytes are believed to outweigh the extra recording capacity that could be realized by not using the filler bytes.

A method of reconstructing the recorded teletext information will now be described.

First, the teletext data for one frame are stored in a memory. It is then determined, on the basis of the broadcasting system identification code in the line identification byte (FIG. 7) and the 50/60 data byte stored in the AUX0, AUX1 areas (FIG. 4), whether or not the stored data can be reconstituted. If it is determined that the recorded data cannot be reconstituted, then the process is terminated. For example, if a tape recorded from a 50 Hz format (e.g., PAL, SECAM) signal is loaded into a Japanese VTR (to be used in the 60 Hz NTSC format), then neither picture nor sound can be reproduced, and it is to be expected that the teletext broadcasting data also cannot be reproduced.

On the other hand, if a 60 Hz format tape on which teletext information broadcast in the U.S. system is loaded into the Japanese VTR (which also operates at 60 Hz), it is to be expected that picture and sound can both be reproduced. However, if the Japanese VTR includes an IC for decoding Japanese teletext broadcasting data, then the U.S. teletext data which has been recorded on the tape cannot be decoded, and accordingly the decoding process is terminated. But if the above-mentioned Japanese VTR includes no such IC, then the teletext broadcasting data can be inserted into predetermined lines of an output composite video signal, and the required decoding of the teletext signal can be performed at the television receiver.

When data from the video data recording area of the recording track is to be written into a buffer memory (not shown), an error correction circuit (not shown) processes the error correction code illustrated in FIG. 2 and a resulting error flag is examined. When it is determined that there is no error in the data, the data is written into the buffer memory, and since the teletext data is written several times in a multiplex fashion, measures such as the above-mentioned "majority-decision" processing can be performed.

After the data is written in the buffer memory, the line number data contained in the first byte (the line i.d. byte) is extracted, and the video tape recorder is placed in the standby mode. A video reproducing circuit includes a composite sync signal generating circuit which is required for outputting the composite video signal. It will be appreciated that such a circuit may be shared with the circuitry shown in FIG. 6B, and that an GATE signal like that shown in FIG. 5 can be generated.

When the GATE signal is at a "low" level, then the line number comparison described with respect to FIG. 6B is carried out, and if it is determined that the line numbers coincide, then the bit synchronizing code (two bytes of "10101010") is generated, the framing code is generated next, and then the teletext data itself is loaded and sequentially shifted out.

Further, as indicated above, a pedestal level is established, "0" bits are set to the pedestal level, and "1" bits are set to a level that is 70% of the white level, as shown in FIG. 16.

These operations are carried out sequentially for each line of the teletext data, with the VTR set remaining in standby mode during this time.

There will now be described a manner in which future advances in image data compression can be accommodated according to the present invention.

At the present time, an intra-frame compression system that compresses data within one frame is favored for home-use digital VTR's. This system requires ten recording tracks per frame. However, if the number of tape tracks required per frame is reduced from ten tracks to five tracks, then the recording capacity of each tape would, in effect, be doubled. It can be anticipated that such a more effective compression system would include inter-frame data compression.

If such a compression system comes about, then two frames of the video signal would be recorded in 10 or 12 tracks, but it can be expected that the quantity of teletext information broadcast in each frame would not be changed. In other words, each frame of teletext data would have to be recorded within five or six tracks.

With respect to the 60 Hz formats, a total data capacity of 32×35 is provided in the ten tracks. Since the maximum number of lines to be used for teletext in each frame is 16, according to the standard, a frame of teletext data can still be recorded satisfactorily in five tracks.

With respect to the 50 Hz formats, the quantity of data may be as much as 1.7 times the data capacity of the 60 Hz formats, since there are as many as 28 lines used for teletext data in the 50 Hz formats. Accordingly, it would be difficult to record one frame of the 50 Hz teletext broadcast information in six tracks using the recording format of FIG. 4. In this case, a portion of the "optional area" shown in FIG. 4 is used for teletext data, as will now be described with reference to FIG. 15.

As shown in FIG. 15, different respective portions of the optional area in the "A" head tracks and the "B" head tracks are used for recording teletext data. However, the mutually different areas in which the teletext data is to be recorded, or from which the data is to be reproduced, can be detected by decoding information indicative of the head to be used and the buffering unit number. Otherwise, the distribution of the lines of data is similar to that shown in FIG. 13.

According to the present invention, in both the ordinary video signal recording mode and in a timer-activated recording mode, any desired teletext broadcast program in any desired channel and at any desired time can be recorded on a recording medium such as a magnetic tape, and without the user being aware of the recording mode. In this way, many types of information can be transmitted via television broadcast signals. For example, stock market data or the like can be received and stored via a personal computer connected to the video tape recorder.

Having described illustrative embodiments of the invention with reference to the accompanying drawings, it is to be understood that the invention is not limited thereto, and that various changes and modifications can be effected therein by one skilled in the art without departing from the scope or spirit of the invention as defined in the appended claims.

What is claimed is:

1. Apparatus for recording a teletext signal, comprising:

means for receiving a broadcast signal that includes a video portion and a teletext data signal transmitted in multiplexed fashion with said video portion, said teletext data signal including at least a teletext information code and a bit synchronizing code for providing bit synchronization to decode said teletext information code;

video signal recording means for recording said video portion of said received broadcast signal as digital video data on a recording medium;

first extracting means for extracting said teletext data signal from said received broadcast signal to provide extracted teletext data signal;

second extracting means for extracting said teletext information code composed of binary data bits from said extracted teletext data signal; and teletext data recording means for recording said binary data bits of said extracted teletext information code on said recording medium but not recording said bit sychronizing code on said recording medium.

2. Apparatus for recording a teletext signal according to claim 1, wherein said teletext data signal transmitted with said video portion of said broadcast signal includes a byte synchronizing code, and further comprising:

means for detecting said byte synchronizing code included in said teletext data signal;

means for generating a country identification number on the basis of said detected byte synchronizing code;

means for generating a line number and a field number in response to said broadcast television signal; and means for recording said country identification number, said line number and said field number on said recording medium together with said binary data bits of said extracted teletext information code; said byte synchronizing code not being recorded on said recording medium.

3. Apparatus for recording a teletext signal according to claim 1; wherein said recording medium is a magnetic tape.

4. Apparatus for recording a teletext signal according to claim 3; wherein said video signal recording means and said teletext data recording means comprise a plurality of rotary magnetic heads which scan said magnetic tape to form a plurality of recording tracks in which said digital video data and said binary data bits of said extracted teletext information code are recorded.

5. Apparatus for recording a teletext signal according to claim 4, wherein said binary data bits of said extracted teletext information code are recorded in said plurality of recording tracks in the form of data bytes interspersed with said digital video data.

6. Apparatus for reproducing a teletext signal, comprising:

means for reproducing a teletext signal from a recording medium on which said teletext signal was recorded with a video signal, said teletext signal having been recorded without a bit synchronizing code therein and accordingly, being reproduced without said bit synchronizing code therein;

means for reproducing said video signal form said recording medium;

means for adding said bit synchronizing code to the reproduced teletext signal; and means for combining said reproduced teletext signal which is added with said bit synchronizing code and said reproduced video signal to form an output video signal having said teletext signal inserted in selected lines of said output video signal.

7. Apparatus for reproducing a teletext signal according to claim 6; wherein said recording medium is a magnetic tape.

8. Apparatus for reproducing a teletext signal according to claim 7; wherein said means for reproducing said teletext signal and said means for reproducing said video signal comprise a plurality of magnetic heads which scan said magnetic tape.

9. Apparatus for reproducing a teletext signal according to claim 6; wherein said output video signal is a composite video signal.

10. Apparatus for reproducing a teletext signal according to claim 6; wherein said selected lines of said output video signal within which said reproduced teletext signal is inserted are within a vertical blanking period of said output video signal.

* * * * *